United States Patent
Florjanczyk et al.

(10) Patent No.: US 9,880,352 B2
(45) Date of Patent: Jan. 30, 2018

(54) COMPOUND SEMICONDUCTOR PHOTONIC INTEGRATED CIRCUIT WITH DIELECTRIC WAVEGUIDE

(71) Applicant: BB Photonics Inc., High Bridge, NJ (US)

(72) Inventors: Miroslaw Florjanczyk, Kanata (CA); William Ring, High Bridge, NJ (US)

(73) Assignee: BB Photonics Inc., High Bridge, NJ (US)

( * ) Notice: Subject to any disclaimer, the term of this patent is extended or adjusted under 35 U.S.C. 154(b) by 0 days.

(21) Appl. No.: 15/217,248

(22) Filed: Jul. 22, 2016

(65) Prior Publication Data

US 2017/0023733 A1    Jan. 26, 2017

Related U.S. Application Data

(60) Provisional application No. 62/195,369, filed on Jul. 22, 2015.

(51) Int. Cl.

| | | |
|---|---|---|
| *G02B 6/12* | (2006.01) | |
| *G02B 6/122* | (2006.01) | |
| *G02B 6/124* | (2006.01) | |
| *G02B 6/13* | (2006.01) | |
| *G02B 6/132* | (2006.01) | |
| *G02B 6/136* | (2006.01) | |
| *H04B 10/00* | (2013.01) | |

(52) U.S. Cl.
CPC ........ *G02B 6/12004* (2013.01); *G02B 6/124* (2013.01); *G02B 6/12016* (2013.01); *G02B 6/1228* (2013.01); *G02B 6/131* (2013.01); *G02B 6/132* (2013.01); *G02B 6/136* (2013.01); *H04B 10/00* (2013.01); *G02B 2006/12104* (2013.01); *G02B 2006/12135* (2013.01); *G02B 2006/12157* (2013.01)

(58) Field of Classification Search
CPC .... G02B 6/12004; G02B 6/136; G02B 6/132; G02B 6/131; G02B 6/124; G02B 6/1228; G02B 6/12016; G02B 2006/12135; G02B 2006/12104; G02B 2006/12157
See application file for complete search history.

(56) References Cited

U.S. PATENT DOCUMENTS

| 4,002,997 A | 1/1977 | Thompson |
|---|---|---|
| 4,389,567 A | 6/1983 | Khoe et al. |

(Continued)

OTHER PUBLICATIONS

N. Watanabe, T. Kimoto and J. Suda, Temperature dependence of the refractive indices of GaN and AlN from room temperature up to 5150C, Journal of Applied Physics. 104, 106101, 2008.

(Continued)

*Primary Examiner* — Ellen Kim
(74) *Attorney, Agent, or Firm* — Sughrue Mion, PLLC

(57) ABSTRACT

A photonic integrated circuit (PIC) is grown by epitaxy on a substrate. The PIC includes at least one active element, at least one passive element, and a dielectric waveguide. The at least one active and passive elements are formed over the substrate and are in optical contact with each other. The dielectric waveguide is formed over the substrate, and is in optical contact with the at least one active and passive elements. The at least one active and passive elements each are formed using a III-V compound semiconductor material.

21 Claims, 17 Drawing Sheets

(56) References Cited

U.S. PATENT DOCUMENTS

| | | | |
|---|---|---|---|
| 5,278,926 | A | 1/1994 | Doussiere |
| 5,703,989 | A | 12/1997 | Khan et al. |
| 5,844,929 | A | 12/1998 | Lealman et al. |
| 5,985,685 | A | 11/1999 | Lealman et al. |
| 6,137,939 | A | 10/2000 | Henry et al. |
| 6,169,838 | B1 | 1/2001 | He |
| 6,456,763 | B2 | 9/2002 | Kashihara et al. |
| 6,490,395 | B1 | 12/2002 | Nara et al. |
| 6,519,380 | B2 | 2/2003 | Dawes et al. |
| 6,549,696 | B1 | 4/2003 | Uetsuka et al. |
| 6,574,409 | B1 | 6/2003 | Moroni et al. |
| 6,701,043 | B2 | 3/2004 | Delisle et al. |
| 6,738,545 | B1 * | 5/2004 | Purchase ............ G02B 6/12011 385/14 |
| 6,798,948 | B2 | 9/2004 | Delisle et al. |
| 6,826,332 | B2 | 11/2004 | Saito et al. |
| 6,842,572 | B2 | 1/2005 | Johannessen |
| 6,954,566 | B2 | 10/2005 | Johannessen |
| 7,397,986 | B2 | 7/2008 | Bulthuis et al. |
| 7,539,364 | B2 | 5/2009 | Cole et al. |
| 7,539,368 | B2 | 5/2009 | Hasegawa et al. |
| 8,036,505 | B2 | 10/2011 | Hasegawa et al. |
| 8,457,459 | B2 | 6/2013 | Hasegawa et al. |
| 8,538,212 | B2 | 9/2013 | McGinnis |
| 8,867,873 | B2 | 10/2014 | Kamei et al. |
| 8,873,910 | B2 | 10/2014 | Bulthuis et al. |
| 9,110,232 | B2 | 8/2015 | McGinnis et al. |
| 2003/0003737 | A1 * | 1/2003 | Delwala ............... G02B 6/1225 438/689 |
| 2013/0308904 | A1 * | 11/2013 | McGinnis .......... G02B 6/12014 385/37 |

OTHER PUBLICATIONS

J.A. McCaulley, V.M. Donnelly, M.Vernon and I. Taha, Temperature dependence of the Near Infrared refractive index of Silicon, Gallium Arsenide and indium phosphide, Mar. 15, 1994, vol. 49 Issue. 11.
V. Raghunathan, W.N. Ye, T. Izuhura, J.Michel, L.Kimerlin, Athermal operation of silicon waveguides: Spectral, second order and footprint dependencies, Optical Express, 2010, pp. 17631-17639, vol. 18, Issue 17.
F.H.P.M Habraken, Characterization of LPCVD and PECVD Silicon Oxynitride Films, Applied Surface Science, 1987, pp. 186-196, vol. 30, Issue 1-4.
A. Gorin, A.Jaouad, E. Grondin, V. Aimez and P. Charette, Fabrication of Silicon Nitride Waveguides for Visible Light using PECVD: as study of plasma frequency on optical properties, Optics Express, Sep. 1, 2008, vol. 16, No. 18.
R.Germann, H.W.M. Salemink, R.Beyeler, G. L. Bona, F. Horst, I. Massarek, B.J. Offrein, Silicon Oxynitride layers for optical waveguide applications, Journal of Electrochemical. Society., 2000, pp. 2237-2241, vol. 147—Issue 6.
S. M. Hu, Stress-related problems in silicon technology, Journal Applied Physics, 1991, vol. 70(6), pp. R53-R80.
M. Hoffmann, P. Kopka, E. Voges, Low-loss fiber-matched low-temperature PECVD waveguides with small core dimensions for optical communication systems, IEEE Photonics Technology. Letters, 1997, pp. 1238-1240, vol. 9 Issue 9.
G. Heise, H. W. Schneider and P. C. Clemens, Optical phased array filter module with passively compensated temperature dependence, ECOC'98, Sep. 20-24, 1998, pp. 319-320, vol. 1, Madrid, Spain.
Y. Inoue, A. Kaneko, F. Hanawa, H. Takahashi, K. Hattori and Sumida, Athermal silica-based arrayed-waveguide grating multiplexer, 1997, p. 1945-1946, vol. 5, Electronic Letters. No. 33.
R. Gao, K. Takayama, A Yeniay and A. F. Garito, Low-insertion loss athermal AWG multi/demultiplexer based on perfluorinated polymers, ECOC'02, 6.2.2, Sep. 8-12, 2002, p. 1-2, Copenhagen, Denmark.
J. B. D. Soole, M. Schlax, C. Narayanan and R. Pafchek, Athermalisation of silica arrayed waveguide grating multiplexers, Aug. 7, 2003, 1182-1184, Electronic Letters No. 39(16).
A. Kaneko, S. Kamei, Y Inoue, H. Takahashi and A. Sugita, Athermal silica-based arrayed waveguide grating (AWG) multiplexers with new low loss groove design, OFC-IOOC'99 Tu01, 1999, pp. 204-206.
F. Olsson, A. Aubert, M. Avella, J. Jimenez, C.A. Barrios, J. Berggren, S. Lourdudoss, Heteroepitaxy of InP on Silicon-on-Insulator for Optoelectronic Integration ,ECS Transactions, 3 (39) 23-29 (2007), 10.1149/1.2818558, copyright The Electrochemical Society.
Yingda Dong, Yae L. Okuno, and Umesh K. Mishra, Selective Area Growth of InP through Narrow Openings by MOCVD and its Application to InP HBT, InP and related materials conference, 2003.
M Gibbon, J P Stagg, C G Cureton, E J Thrush, C J Jones, R E Mallard, R E Pritchard, N Collis and A Chew, Selective-area low-pressure Mocvd of GaInAsP and related materials on planar InP substrates, Semiconductor Science and Technology Journal, vol. 8, No. 6.
Masahiro Aoki, Makoto Suzuki, Hirohisa Sano, Toshihiro Kawano, Tatemi Ido, Tsuyoshi Tzdwatari, Kazuhisa Uomi, and Atsushi Takai, InGaAs/InGaAsP MQW Electro-absorption Modulator Integrated with a DFB Laser Fabricated by Band Gap Energy Control Selective Area MOCVD, IEEE Journal of Quantum Electronics, Jun. 1993, vol. 29, No. 6.
I. Moerman, G. Vermeire, M. D'Hondt, W. Vanderbauwhede, J. Blondelle, G. Coudenys, P. Van Daele, P. Demeester, III—V semiconductor waveguiding devices using adiabatic tapers, Microelectronics Journal, Nov. 1994, vol. 25, Issue 8.
Fengnian Xia, Vinod M. Menon, Member, IEEE, and Stephen R. Forrest, 19. Photonic Integration Using Asymmetric Twin-Waveguide (ATG) Technology:Part I—Concepts and Theory, IEEE Journal of selected topics in quantum electronics, Jan./Feb. 2005, vol. 11, Issue No. 1.
V. M. Menon, F. Xia, and S. R. Forrest, Photonic integration using asymmetric twin-waveguide (ATG) technology. II. Devices, IEEE J. Sel. Topics Quantum Electron., Jan./Feb. 2005, pp. 30-42, vol. 11, No. 1.
P. V. Studenkov, M. R. Gokhale, and S. R. Forrest, Efficient coupling in integrated twin-waveguide lasers using waveguide tapers, IEEE Photonic Technology Letters, pp. 1096-1098, vol. 11 Issue 9.
H. Kunzel, S. Ebert, R. Gibis, R. Kaiser, H. Kizuki, S. Malchow, and G. Urmann, Selective MOMBE growth of InP-based waveguide/laser butt-joints, J. Crystal Growth, 1998, pp. 52-56, vol. 198.
J. F. Bauters, M. L. Davenport, M. J. R. Heck, J. K. Doylend, A. Chen, A. W. Fang, and J. E. Bowers, Silicon on ultra-low-loss waveguide pho- tonic integration platform, Optical Express, Jan. 2013, pp. 544-555, vol. 21, No. 1.
J.Wallin, G.Landgren, K.Streubel, S.Nilsson and M.Oberg, Selective area regrowth of butt-joint coupled waveguides in multi-section DBR lasers, J. Crystal. Growth, 1992, pp. 741-746, vol. 124.
Molly Piels, Jared F. Bauters, Michael L. Davenport, Martijn J. R. Heck, and John E. Bowers, Low-Loss Silicon Nitride AWG Demultiplexer Heterogeneously Integrated With Hybrid III—V/Silicon Photo-detectors, Journal of Lightwave Technology, 2014, pp. 817-823, vol. 32 Issue 4.
G. Kurczveil, P. Pintus, M. J. R. Heck, J. D. Peters, and J. E. Bowers, Characterization of insertion loss and back reflection in passive hybrid silicon tapers, IEEE Photonic. Journal., Apr. 2013, vol. 5, No. 2, article No. 6600410.
Eun-Seok Kang, Woo-Soo Kim, Duk-Jun Kim, and Byeong-Soo Bae, Reducing the Thermal Dependence of Silica-Based Arrayed-Waveguide Grating Using Inorganic—Organic Hybrid Materials, IEEE Photonics Technology Letters, Dec. 2004, vol. 16 Issue No. 12.
Koichi Maru, Yukio Abe, Masanobu Ito, Hiroshi Ishikawa, Susumu Himi, Hisato Uetsuka, Member, IEEE, and Tetsuya Mizumoto, 2.5% Δ Silica-Based Athermal Arrayed Waveguide Grating Employing Spot-Size Converters Based on Segmented Core, IEEE Photonics Technology Letters, Nov. 2005, vol. 17 Issue No. 11.

* cited by examiner

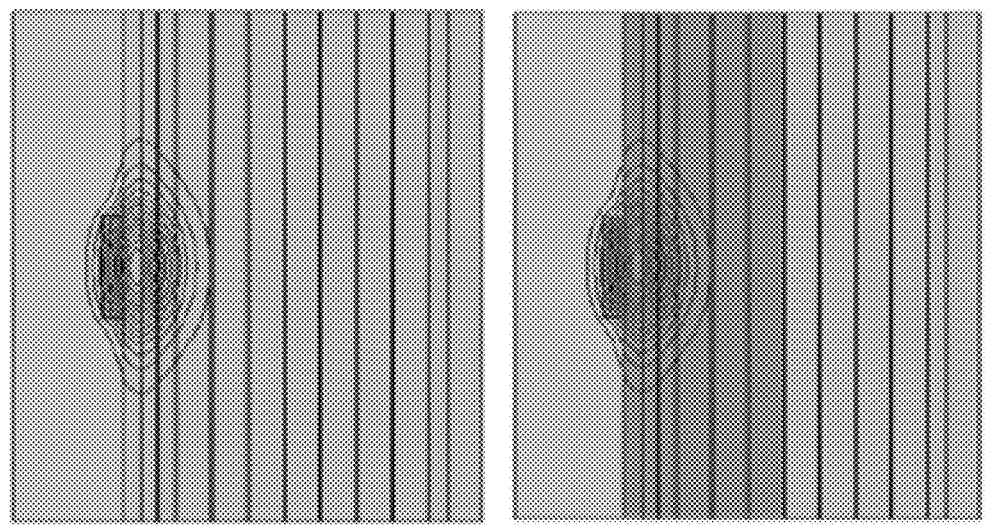
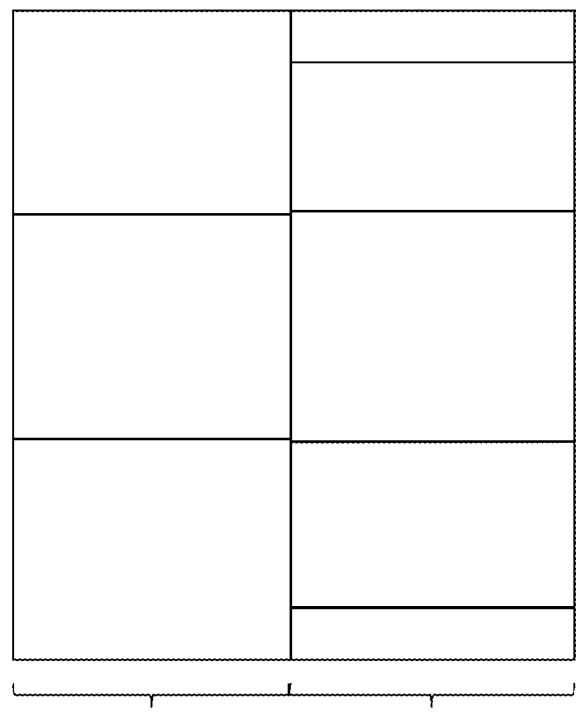
FIG. 13

COMPOUND SEMICONDUCTOR PHOTONIC INTEGRATED CIRCUIT WITH DIELECTRIC WAVEGUIDE

FIELD OF THE INVENTION

This invention relates to photonic integrated circuits and more particularly to dielectric waveguides and dielectric structures on semiconductor substrates and photonic integrated circuits.

BACKGROUND OF THE INVENTION

Photonic Integrated Circuits (PICs) integrate different optical functionalities on a single photonic chip. The PICs enable the production of complex optical circuits using high volume semiconductor wafer fabrication techniques. Due to the above mentioned abilities, the PICs are utilized in optical communication networks. Accordingly, they offer to reduce component footprint, eliminate multiple packaging issues and multiple optical alignments, and eventually achieve the unprecedented cost efficiency and volume scalability in mass production of consumer photonics products.

In the context of applications, the advantages of PIC become especially compelling when active waveguide devices such as laser, photodetector, and the like, are combined with passive waveguide devices and elements of a waveguide circuit, to form a highly functional photonic system on the chip with minimal optical ports. The active devices that modulate optical signals by electrical means are usually made from artificially grown semiconductors having bandgap structures adjusted to the function and wavelength range of their particular application. These semiconductors are utilized as base material of the PICs. Accordingly, semiconductor based PICs in which several functions such as optical signal detection, modulation, and optical signal emission are implemented in a single monolithic semiconductor chip are a promising solution. Further, indium phosphide (InP) and its related III-V semiconductor material system offer additional benefits as they allow the fabrication of active devices operating in the important wavelength ranges around 1300 nm and 1550 nm, i.e., in the two dominant low-loss transmission windows of the glass fibers. However, even such monolithic integration can provide cost barriers with poor design methodologies, low manufacturing yields, complicated manufacturing processes, and repeated expensive epitaxial growth processes. Accordingly, single step epitaxial wafer growth methodologies in conjunction with established wafer fabrication technologies, have received attention as a means to further enable reduced optical components cost.

Alternatively, gallium arsenide (GaAs) and aluminum gallium arsenide (AlGaAs) may be employed for 850 nm and 1300 nm PICs. Further, PICs may be employed across visible and near ultraviolet regions through exploitation of other tertiary and ternary semiconductor materials employing indium (In), gallium (Ga), aluminum (Al), arsenic (As), and phosphorous (P). The function of any waveguide device within a PIC composed of epitaxially grown semiconductor heterostructures is pre-determined by its band structure and, more particularly by the bandgap wavelength of the waveguide core layer(s), the cladding layer(s), and the substrate. Accordingly, functionally different devices are typically made from different, yet compatible, semiconductor materials although through targeted design some structures can provide optical amplification and photodetection with reversed bias polarity. However, the selection of substrate and waveguide design has a profound impact both on the design and fabrication of the PIC.

In several PICs ranging from wavelength division multiplexers (WDMs), wavelength division demultiplexers (also referred to as WDMs), optical power (channel) monitors, reconfigurable optical add-drop multiplexers (ROADMs), and dynamic gain (channel) equalizers (DGEs/DCEs), at least one multi-wavelength signal is spectrally dispersed, detected, monitored, and processed on a per wavelength basis. For an array of multi-wavelength signals, the array of multi-wavelength signals are monitored and processed on a per wavelength basis and then multiplexed to form a multi-wavelength outgoing signal. These PICs must operate on predetermined channel wavelength plans (i.e., O-band (Original; 1260 nm≤λ≤1360 nm); E-band (Extended; 1360 nm≤λ≤1460 nm); S-band (Short; 1430 nm≤λ≤1530 nm); C-band (Conventional; 1530 nm≤λ≤1565 nm); and L-band (Long; 1565 nm≤λ≤1625 nm),) as the different wavelength optical signals are generally provided from a plurality of remote and discrete transmitters. The channel wavelength plans are defined by the International Telecom Union in ITU-T G.694.1 "Spectral Grids for WDM applications: DWDM Frequency Grid." Accordingly, the ITU-T G.694.1 defines a fixed grid that exploits channel spacing of 12.5 GHz, 25 GHz, 50 GHz, and 100 GHz according to the equation (1) as shown below:

$$193.1\ \text{THz} + n*\text{Spacing}/1000 \qquad (1)$$

where Spacing=12.5 GHz, 25 GHz, 50 GHz, and 100 GHz, and n≥0 within the C and L bands of the optical spectrum.

There is also a flexible grid with channels centered at $193.1\ \text{THz} + n*0.00625$, where n≥0, i.e., at 6.25 GHz centers, and channel bandwidths defined by 12.5 GHz*m, where m≥0. Instead of dense WDM (DWDM) other systems exploit coarse WDM (CWDM) as specified by ITU-T G.694.2 that defines wavelengths from 1271 nm through 1611 nm with a channel spacing of 20 nm.

The temperature stability of the PICs becomes a design constraint over operating temperature ranges of 0° C.≤T≤70° C., i.e., during internal customer premises and telecom installations, and −40° C.≤T≤85° C. for external plant. Further, at channel spacing of ~0.8 nm (100 GHz) and ~0.4 nm (50 GHz), the temperature dependencies in terms of nm/° C. become significant. However, InP exhibits a temperature sensitivity of ~0.1 nm/° C. such that over 0° C.≤T≤70° C. the wavelength will shift ~7 nm and ~9/~18 channels at 100 GHz/50 GHz respectively. As such, temperature control through heaters and thermoelectric coolers has become a standard within InP and other compound semiconductor PICs. However, as we move from considering a single DFB laser through to a 4-channel, 16-channel, and a 40-channel PIC, such as CWDM and DWDM receivers with integrated photodiodes, the die footprint increases significantly, primarily from the WDM component, such that active temperature stabilization becomes increasingly difficult to achieve. Further, there are additional issues that arise with integration, for example, thermal crosstalk between adjacent elements and the like.

Referring now to FIG. 1, a temperature dependent wavelength offsets of InP and $SiO_2$ echelle gratings according to designs of the prior art are shown. First chart 100A shows an expected transmission shift of one channel of an InP Echelle grating WDM with a Gaussian passband characteristic. The peak shifts approximately by +7.6 nm over 85° C. corresponding to $d\lambda/dT \approx +0.09$ nm/° C. Accordingly, in order to deploy such an InP WDM the effective $dn/dT_{AMB}$ of the WDM must be modified by some form of compensation so that the effect of ambient temperature, $T_{AMB}$, is reduced. Within the prior art this may be through exploiting a thermoelectric cooler to maintain the InP die temperature at a nominal value, e.g., $T_{InP}=35°$ C. or through the employment of on-chip micro-heaters exploiting resistive metal traces such that the nominal InP die temperature is set above the maximum operating temperature, e.g. $T_{AMB}=70°$ C.-$85°$ C. in order to avoid control issues at $T_{InP}=100°$ C. Within the prior art it is also known that compensating for the inherent refractive index change of a material can be compensated by integrating a second waveguide section with the opposite dn/dT or by modifying the waveguide design to include a cladding material with negative dn/dT such that the effective temperature induced index change of the waveguide is reduced.

However, heaters and thermo-electric coolers can require significant electrical power consumption and also impose complex thermal management requirements upon the die packaging even for just a passive DWDM to ensure uniform temperature even before active devices are considered. Further, negative temperature coefficient materials, i.e., dn/dT<0, are typically polymeric and have low coefficients such that compensating a high dn/dT material such as InP requires significant waveguide real estate to achieve the desired balance. However, other waveguide material systems provide different dn/dT and hence dλ/dT. For example, referring to second chart 100B there is plotted the expected transmission shift of one channel of an $SiO_2$ Echelle grating WDM with a Gaussian passband characteristic. Compared to $dn_{InP}/dT \approx 2 \times 10^{-4}$ silica offers $dn_{SiO2}/dT \approx 2 \times 10^{-5}$ such that over $85°$ C. the center wavelength shifts ≈0.8 nm which is equivalent to $d\lambda/dT \approx +0.009$ nm/° C., an order of magnitude lower than InP.

Furthermore, when an InP waveguide is deposited on an $SiO_2$ substrate, due to mismatch between the lattice structure of the InP waveguide and the $SiO_2$, the InP waveguide cracks due to high stress between the InP waveguide and the $SiO_2$ substrate.

It would therefore be beneficial to provide PIC designers with an alternate WDM compatible with monolithic integration on compound semiconductor PICs that provides for athermal performance such that temperature control of the WDM element can be significantly reduced, thermal management issues are resolved, and that consumes less power.

SUMMARY OF THE INVENTION

It is an object of the present invention to mitigate limitations in the prior art related to photonic integrated circuits and more particularly to dielectric waveguides and dielectric structures on semiconductor substrates and photonic circuits.

In an embodiment, a photonic integrated circuit (PIC) is provided. The PIC is grown by epitaxy on a substrate. The PIC includes at least one active element, at least one passive element, and a dielectric waveguide. The at least one active and passive elements are formed over the substrate and are in optical contact with each other. The dielectric waveguide is formed over the substrate, and is in optical contact with at least one of the active and passive elements. The at least one active element and the at least one passive element each are formed using a III-V compound semiconductor material.

In another embodiment, a method for fabricating a photonic integrated circuit on a substrate is provided. The method includes providing a substrate. The method further includes providing a compound semiconductor structure that includes a first plurality of layers upon the substrate. The method further includes etching a plurality of vertical features within at least one of the substrate and a predetermined portion of the compound semiconductor structure. The method further includes depositing a first dielectric structure that includes a second plurality of layers upon the substrate such that the dielectric structure abuts the plurality of vertical features.

In yet another embodiment, a method for fabricating a photonic integrated circuit on a substrate is provided. The method comprises providing a substrate. The method further comprises providing a first III-V compound semiconductor structure comprising a plurality of first layers upon the substrate. The method further comprises etching a first plurality of vertical features within at least one of the substrate and a predetermined portion of the first III-V compound semiconductor structure. The method further comprises providing a second III-V compound semiconductor structure to form at least one of a buried waveguide and a grating structure. The method further comprises etching a second plurality of vertical features within at least one of the substrate and the second III-V compound semiconductor structure. The method further comprises depositing a first dielectric structure comprising a second plurality of layers upon the substrate such that the first dielectric structure at least one of abuts and fills a first predetermined portion of the second plurality of vertical features. The method further comprises etching the first dielectric structure to form a dielectric waveguide.

Various embodiments of the present invention provide a photonic integrated circuit (PIC) with a waveguide grown by epitaxy on a substrate made of a III-V compound semiconductor material. The PIC includes at least one active element, at least one passive element, and a dielectric waveguide. The at least one active and passive elements are formed over the substrate and are in optical contact with each other. The dielectric waveguide is formed over the substrate, and is in optical contact with the at least one active and passive elements. The at least one active and passive elements each are formed using a III-V compound semiconductor material.

The dielectric waveguide is composed of materials that have a lower variation of refractive index with temperature. To reduce power losses, the dielectric waveguide is mode matched to the waveguide of the PIC. The PIC further includes an anti-reflection coating layer deposited between the waveguide and the dielectric waveguide to reduce the effect of thin film interference. As no heater and thermo-electric coolers are involved in temperature control, the overall size of the PIC is reduced.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. Embodiments of the present invention will now be described, by way of example only, with reference to the attached Figures, wherein:

FIGS. 12 and 13 are simulations and graphs showing optical modeling results for the waveguide structure of FIG. 10 in accordance with another embodiment of the present invention;

DETAILED DESCRIPTION

Figure 1:
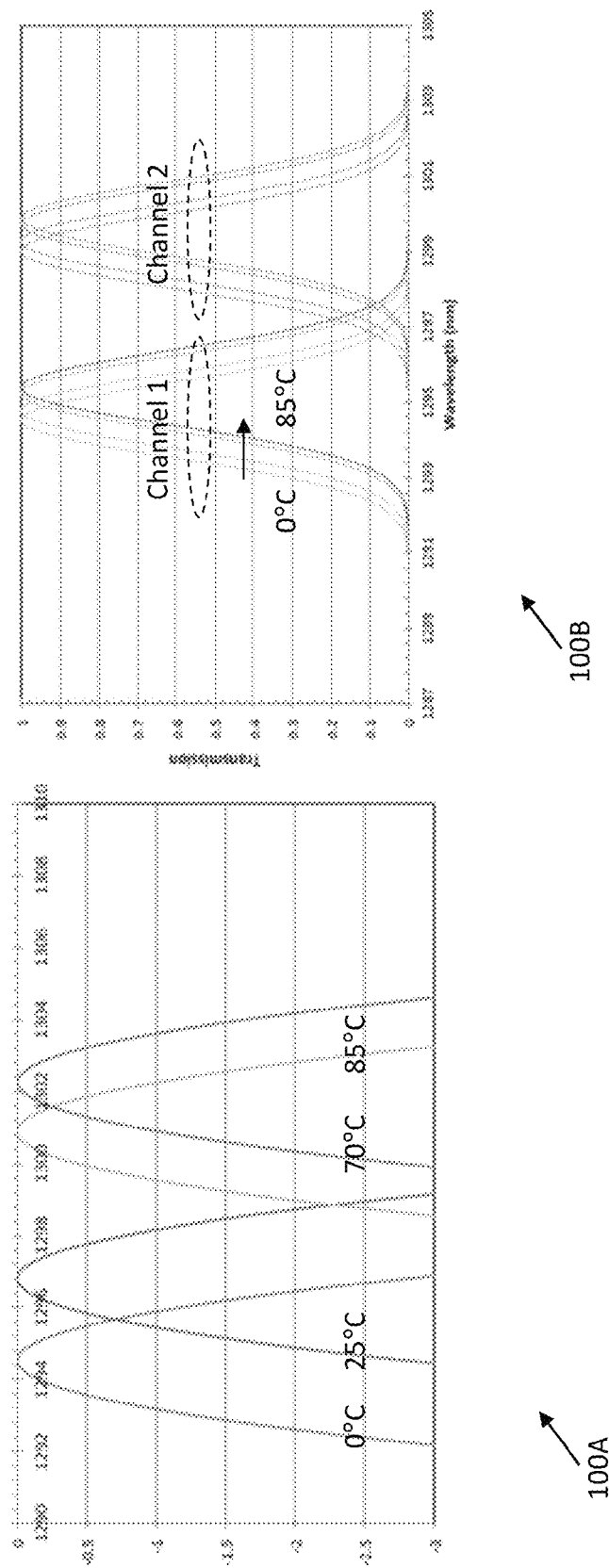
FIG. 1 is a graph showing temperature dependent wavelength offsets for InP and $SiO_2$ echelle gratings according to designs of prior art.

The present invention is directed to photonic integrated circuits and more particularly to dielectric waveguides and dielectric structures on semiconductor substrates and photonic circuits.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

An "emitter" or "distributed feedback (DFB) laser" or "light emitting diode" (LED) as used herein and throughout this disclosure refers to, but is not limited to, a type of optical emitter that uses semiconductor light emitting structures such as semiconductor junctions, pn junctions, pin junctions, quantum structures, and quantum dots. Such structures can comprise single or multiple quantum structures and junctions to generate single or multiple wavelengths and combinations thereof. Such optical emitters may include, but are not limited to, semiconductor LEDs, semiconductor DFB lasers, semiconductor external cavity lasers (ECLs), and fixed wavelength emitters and tunable emitters. Such an optical emitter exploits the recombination of electrons and holes within the optical device to generate photons whose color (corresponding to the energy of the photon) is determined by the energy band gap of the semiconductor within which they are generated.

A "semiconductor" as used herein and throughout this disclosure refers to, but is not limited to, a material having an electrical conductivity value falling between that of a conductor and an insulator. The material may be an elemental material or a compound material. A semiconductor may include, but not be limited to, an element, a binary alloy, a tertiary alloy, and a quaternary alloy. Structures formed using a semiconductor or semiconductors may comprise a single semiconductor material, two or more semiconductor materials, a semiconductor alloy of a single composition, a semiconductor alloy of two or more discrete compositions, and a semiconductor alloy graded from a first semiconductor alloy to a second semiconductor alloy. A semiconductor may be one of undoped (intrinsic), p-type doped, n-typed doped, graded in doping from a first doping level of one type to a second doping level of the same type, and graded in doping from a first doping level of one type to a second doping level of a different type. Semiconductors may include, but are not limited to III-V semiconductors, such as those between aluminum (Al), gallium (Ga), and indium (In) with nitrogen (N), phosphorous (P), arsenic (As) and tin (Sb), including for example GaN, GaP, GaAs, InP, InAs, AN and AlAs.

A "metal" as used herein and throughout this disclosure refers to, but is not limited to, a material (element, compound, and alloy) that has good electrical and thermal conductivity as a result of readily losing outer shell electrons. This may include, but not be limited to, gold, chromium, aluminum, silver, platinum, nickel, copper, rhodium, palladium, tungsten, and combinations of such materials.

An "electrode," "contact", "track", "trace", or "electrical terminal" as used herein and throughout this disclosure refers to, but is not limited to, a material having an electrical conductivity which is optically opaque. This includes structures formed from thin films, thick films, and plated films for example of materials including, but not limited to, metals such as gold, chromium, aluminum, silver, platinum, nickel, copper, rhodium, palladium, tungsten, and combinations of such materials. Other electrode configurations may employ combinations of metals, for example, a chromium adhesion layer and a gold electrode layer.

A "quantum structure" as used herein and throughout this disclosure refers to, but is not limited, to a semiconductor structure having physical dimensions in one or more axes that are small enough that the properties of electrons and holes are governed by quantum mechanical and quantum electrical properties. This may include, but not be limited to, a quantum dot which is a nanocrystal of a semiconductor material small enough that its excitons are confined in all three spatial dimensions, a quantum well wherein the excitons are confined in one dimension such that they may move in a planar layer, and a quantum wire wherein the excitons are confined in two dimensions. A "quantum structure" may include, but not be limited to, a discrete quantum structure such as a colloidal quantum dot, a discrete quantum wire such as a nanotube, a quantum structure within a semiconductor structure such as a quantum dot within a nanowire, a quantum structure within another quantum structure such as a quantum dot within a quantum well or quantum dot within another quantum dot.

A "substrate" as used herein and throughout this disclosure refers to, but is not limited to, a surface upon which semiconductor structures, such as a PIC and embodiments of the invention may be grown. This may include, but not be limited to, InP, GaAs, silicon, silica-on-silicon, silica, silica-on-polymer, glass, a metal, a ceramic, a polymer, or a combination thereof.

A "mode" as used herein and throughout this disclosure, refers to the configuration of the electromagnetic radiation supported by a medium which has a structure that is invariant by translation along the direction of propagation of the "mode". This includes, but is not limited to, modes of electromagnetic radiation within the visible to near-infrared regions of the electromagnetic spectrum that are confined to a waveguide.

An "optical waveguide", "dielectric waveguide", or "waveguide" as used herein and throughout this disclosure refers to, but is not limited to, a dielectric medium or combination of medium invariant along the direction of propagation, supporting the propagation of optical signals within a predetermined wavelength range. An optical waveguide may be at least one of an isolated structure comprising at least a core and a cladding, e.g., an optical fiber, formed as part of a carrier, formed within a substrate, e.g., planar lightwave circuits, photonic integrated circuit, integrated optical devices, and an optical waveguide. This includes, but is not limited to, flexible optical waveguides formed from extruded glass, extruded doped silica, extruded chalcogenide glasses, and polymer. This further includes, but is not limited to, optical waveguides formed within AlGaAs—GaAs material systems, InGaAsP—InP material systems, ion-exchanged glass, ion-exchanged ferroelectric materials (e.g. proton exchanged LiNbO3), doped ferroelectric materials (e.g. titanium doped lithium niobate), silica-on-insulator, silica-on-silicon, doped silicon, ion implanted silicon, polymer on silicon, silicon oxynitride on silicon, polymer on silicon, Silicon-On-Isolator (SOI) and polymer on polymer.

An "optical fiber" as used herein, and throughout this disclosure refers to a flexible optical waveguide that transmits optical signals over a predetermined wavelength range. This includes, but is not limited to, step-index optical fibers, graded-index optical fibers, silica optical fibers, chalcogenide glass optical fibers, and polymer optical fibers. Such optical fibers may be multimode fibers that support multiple modes. Such optical fibers may be circular, thereby supporting multiple modes that are at least one of laterally, vertically, and radially symmetric modes, rectangular thereby supporting multiple modes laterally but single mode vertically, rectangular supporting multiple modes laterally with limited modes vertically (e.g. 2-5), as well as waveguides with similar or other cross-sections. Such optical fibers may be discrete, in ribbon format assembled from discrete optical fibers with discrete claddings per optical fiber, in ribbon format with common cladding between optical fibers, optical fibers embedded in a polymer flexible film, and optical fibers attached to a polymer flexible film.

A "receiver" as used herein, and throughout this disclosure, refers to a device that converts received optical signals to electrical signals. This includes, but is not limited to, discrete photodetectors, integrated photodetectors, photodetectors with electrical amplification, photodetectors with electrical gain and logic generation circuits, p-n photodiodes, p-i-n photodiodes, avalanche photodiodes, and metal-semiconductor-metal photodetectors.

A "multiplexer" (MUX) as used herein, and throughout this disclosure, refers to a device that combines a plurality of source channels and provides a single combined output. This includes, but is not limited to, passive multiplexers, active multiplexers with transmitters and WDM, active multiplexers with receivers, transmitters and WDM, unidirectional multiplexers and bidirectional multiplexers.

A "demultiplexer" (DMUX) as used herein, and throughout this disclosure, refers to a device that combines a plurality of source channels and provides a single combined output. This includes, but is not limited to, passive demultiplexers, active demultiplexers with receivers and WDM, active demultiplexers with receivers, transmitters and WDM, unidirectional demultiplexers and bidirectional demultiplexers.

Figure 2:
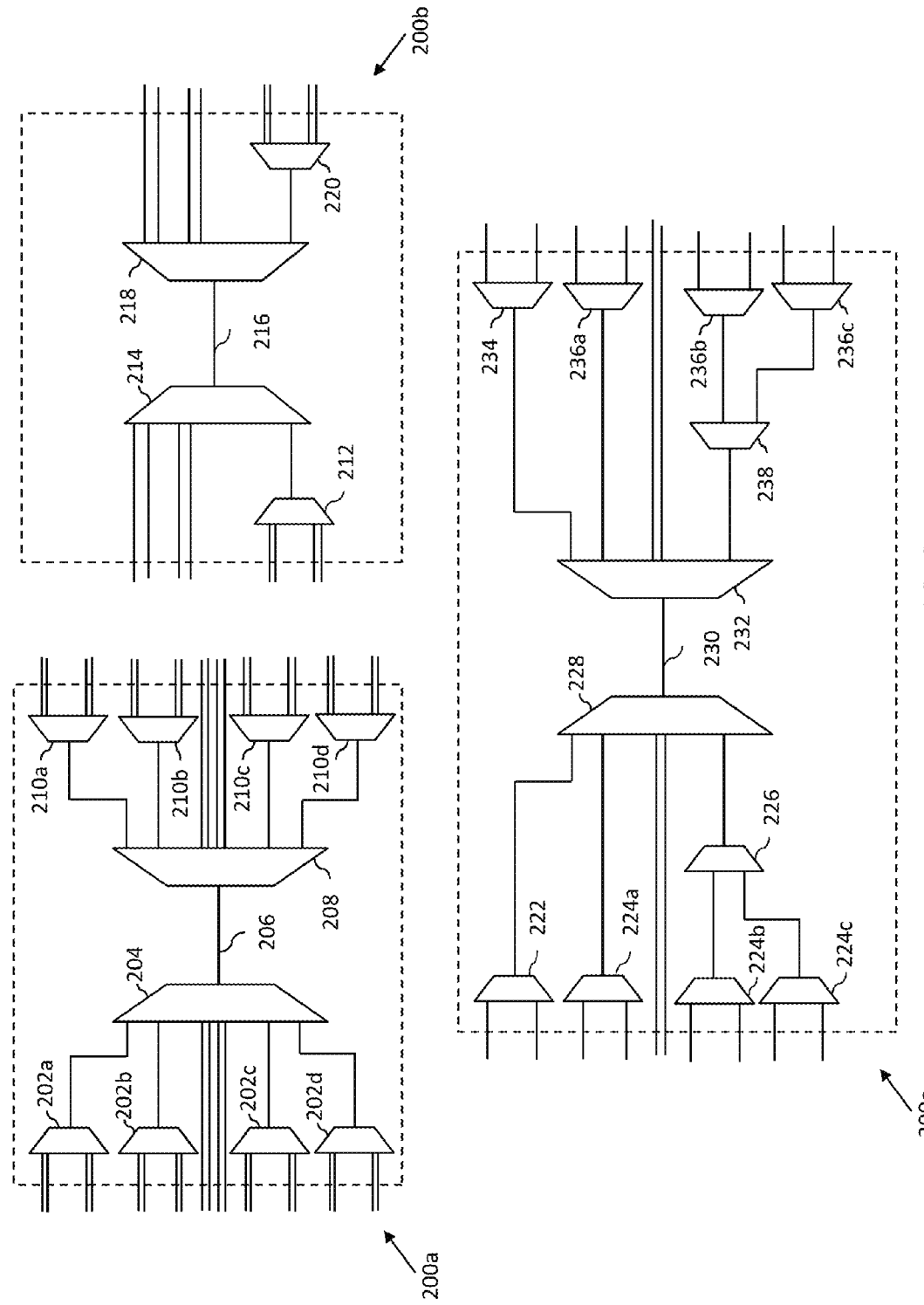
FIG. 2 is a schematic block diagram of first through third optical networks that exploit low, medium, and high channel count wavelength division multiplexers and demultiplexers, in accordance with an embodiment of the present invention.

Referring now to FIG. 2, first through third optical networks 200A-200C exploiting low, medium, and high channel count dense wavelength division multiplexers (DWDM MUXs) and demultiplexers (DWDM DMUXs), respectively, in accordance with an embodiment of the present invention are shown. The first optical network 200a represents one optical plane of two optical planes, one for transmission from "left" to "right" commonly referred to as "east" in optical links and the other for transmission from "right" to "left" commonly referred to as "west." Each of the east and west links of the first optical network 200a includes first through fourth MUXs 202a-202d, a DWDM MUX 204, an optical fiber 206, a DWDM DMUX 208, and first through fourth DMUXs 210a-210d. Each of the DWDM MUX 204 and the DWDM DMUX 208 support 40 channels. Further, the DWDM MUX 204 has 8 discrete DWDM input channels. In an embodiment, each of the first through fourth MUXs 202a-202d receives first through fourth input optical signals. The first through fourth input signals received by the first MUX 202a is in a first predetermined sub-band. Further, the corresponding first through fourth input signals received by the second through fourth MUXs 202b-202d are in second through fourth predetermined sub-bands, respectively. Thus, the first through fourth MUXs 202a-202d output first through fourth output optical signals in a corresponding sub-band. The DWDM MUX 204 is connected to the first through fourth MUXs 202a-202d for receiving the first through fourth output optical signals, respectively. Further, the DWDM MUX 204 receives fifth and sixth input signals. The DWDM MUX 204 outputs a first output optical signal. The optical fiber 206 is coupled to the DWDM MUX 204 for receiving the first output optical signal. The DWDM DMUX 208 is coupled to the optical fiber 206 for receiving the first output optical signal. The DWDM DMUX 208 has 8 discrete DWDM output channels. The first through fourth DMUXs 210a to 210d are connected to the DWDM DMUX 208. The DWDM DMUX 208 receives the first output optical signal and separates the first output optical signal into intermediate output signals, such that each intermediate output signal is a sub-band of the first output optical signal. The first through fourth DWDM DMUXs 210a-210d receive the corresponding intermediate output signals and output the corresponding intermediate output signals. In another embodiment, the DWDM MUX and DMUX 204 and 208 may provide direct optical throughput for at least one of four 8-channel bands and 8 single channels for optical-electrical-optical (OEO) conversion. In an example, with the DWDM MUX 204 each 8-channel band is multiplexed, coupled into the electrical domain via a photodetector, coupled to an emitter, and then multiplexed with the other channels.

The second optical network 200b includes an expansion DWDM MUX 212, a DWDM MUX 214, a single mode optical fiber 216, a DWDM DMUX 218, and an expansion DWDM DMUX 220. The DWDM MUX 214 is coupled to the single mode optical fiber 216. The DWDM DMUX 218 is coupled to the single mode optical fiber 216. Each of the DWDM MUX 214 and the DWDM DMUX 218 supports 40 channels but may support 8, 16, 24, 32, and 48 channels. Further, each of the DWDM MUX 214 and the DWDM DMUX 218 includes an optical interleaver that multiplexes and demultiplexes a pair of 100 GHz combs offset by 50 GHz relative to one another into a combined 50 GHz DWDM comb, respectively. The expansion DWDM MUX 212 and the expansion DWDM DMUX 220 are 40 channel DWDM devices with their frequency grids offset by 50 GHz relative to the DWDM MUX 214 and the DWDM DMUX 218.

In another embodiment, a band filter may be employed such that the DWDM MUX 214 and the DWDM DMUX 218 are operating in a non-overlapping wavelength range, e.g., L-band between 1565 nm≤λ≤1625 nm and C-band between 1530 nm≤λ≤1565 nm.

The third optical network 200c includes a first 8-channel coarse wavelength division multiplexer (CWDM) 222, second through fourth 8-channel DWDM MUXs 224a-224c, a fifth CWDM MUX 226 that operates at 155 mm, a CWDM Band MUX 228 with 1310 nm Overlay, a single mode optical fiber 230, a CWDM band DMUX 232 with 1310 nm Overlay, a first CWDM 8-channel DMUX 234, second through fourth 8-channel DWDM DMUXs 236a-236c, and a fifth CWDM DMUX 238 that operates at 1551 nm. The CWDM Band MUX 228 is coupled to the single mode optical fiber 230. The first CWDM MUX 222 and the second DWDM MUX 224a are connected to the CWDM Band MUX 228. The third and fourth DWDM MUXs 224b and 224c are connected to the CWDM Band MUX 228 by way of the fifth CWDM MUX 226. The first CWDM MUX 222 has a 1310 nm wideband channel with 8 CWDM input channels and the second DWDM MUX 224a has a 1531 nm CWDM input channel supporting 8 DWDM wavelengths. Each of the third and fourth DWDM MUXs 224b and 224c support 8 channel DWDM wavelengths. In another embodiment, the CWDM band MUX 228 is connected to 6 CWDM channel inputs.

The CWDM band DMUX 232 is connected to the first DMUX 234 and the second DMUX 236a. Further, the CWDM band DMUX 232 is connected to the third and fourth DMUXs 236b and 236c by way of the fifth DMUX 238. The first DMUX 234 has a 1310 nm wideband channel with 8 CWDM output channels and the second DMUX 236a has a 153 mm CWDM channel supporting 8 DWDM wavelengths. The third and fourth DWDM DMUX 236b and 236c each support 8 channel DWDM wavelengths. In another embodiment, the CWDM band DMUX 232 is connected to 6 CWDM channel inputs.

Figure 3B:
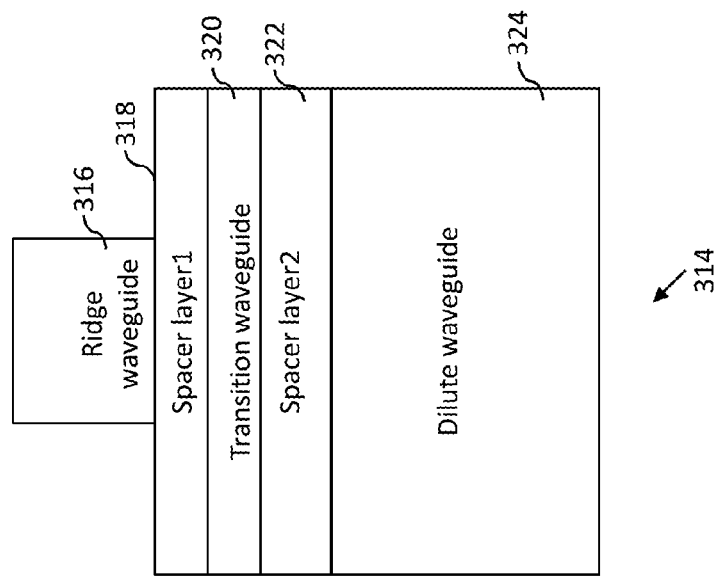
FIG. 3B is a high level schematic cross-section of an optical receiver supporting InP and $SiO_2$-on-InP waveguide sections of the PIC of FIG. 3A in accordance with an embodiment of the present invention.
Figure 3A:
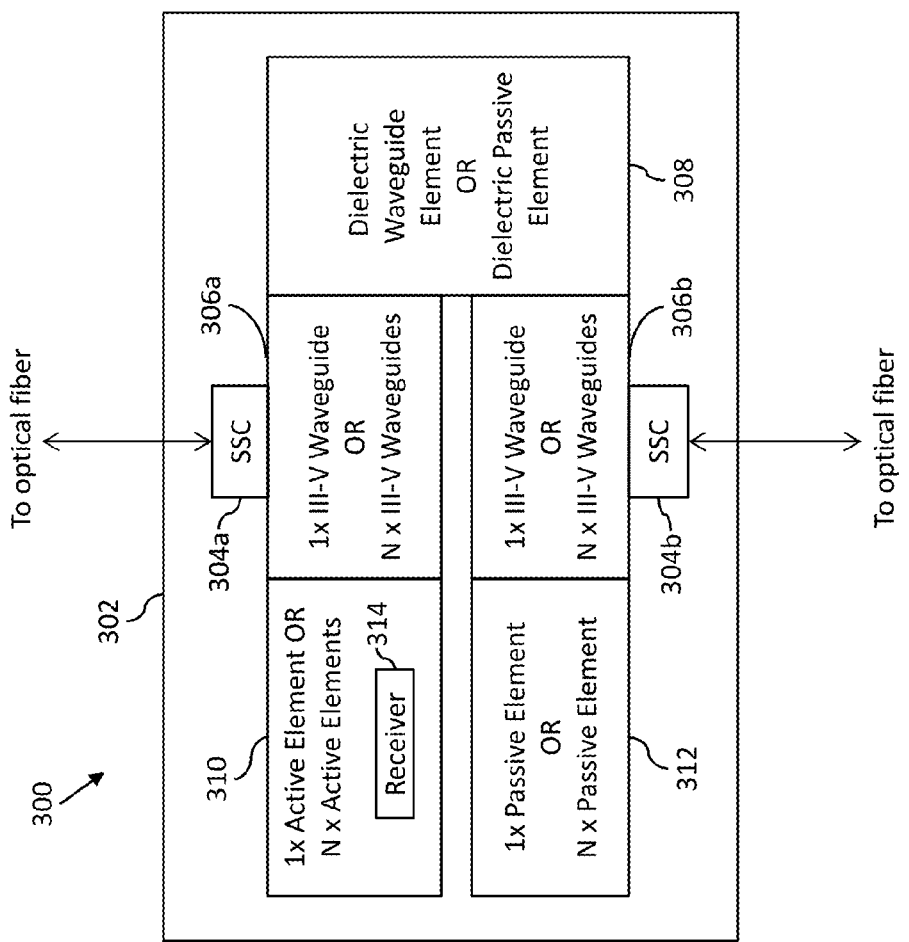
FIG. 3A is a top view of a photonic integrated circuit (PIC) in accordance with an embodiment of the present invention.

FIG. 3A depicts a top view of a photonic integrated circuit (PIC) 300 in accordance with an embodiment of the present invention. Each of the MUX 202a-202d, 204, 212, 214, 222, 224a-224c, 226, and 228 and DMUX 208, 210a-210d, 218, 220, 232, 234, 236a-236c, and 238 in the first through third optical networks 200a-200c can be implemented using the PIC 300. The PIC 300 is grown by epitaxy on a substrate 302. In present embodiment, the substrate 302 is formed using a III-V semiconductor material. In an example, the III-V semiconductor material of the substrate 302 is at least one of InP, InGaAs(P), and GaAs. In an embodiment, the PIC 300 includes first and second spot-size converters (SSCs) 304a and 304b, a first III-V waveguide 306a that is in optical contact with the first SSC 304a, a second III-V waveguide 306b that is in optical contact with the second SSC 304b, a dielectric waveguide 308, at least one active element 310, and at least one passive element 312. The first and second III-V waveguides 306a and 306b are collectively referred to as "III-V waveguides 306". In another embodiment, the PIC 300 includes the first and second spot-size converters (SSCs) 304a and 304b, a first set of III-V waveguide 306a that are in optical contact with the first SSC 304a, a second set of III-V waveguide 306b that are in optical contact with the second SSC 304b, the dielectric waveguide 308, the at least one active element 310, and the at least one passive element 312. The at least one active element 310 includes an optical receiver 314. The PIC 300 comprises an alloy of at least one of InGaAsP, AlGaAs, and InGaAlAs. In present embodiment, to deposit the dielectric waveguide 308, the substrate 302 is etched at an angle which is within 5 degrees of a normal to the substrate 302. The angle at which the substrate 302 is etched is also referred to as "re-entrant profile". Thus, the re-entrant profile is within 5 degrees of a normal to the substrate 302.

In one embodiment, the first SSC 304a is connected between the dielectric waveguide 308 and the first III-V waveguide 306a, and the second SSC 304b is connected between the dielectric waveguide 308 and the second III-V waveguide 306b. In another embodiment, the first and second SSCs 304a and 304b are connected between the first and second optical fibers and the first and second III-V waveguides 306a and 306b, respectively. In yet another embodiment, the first SSC 304a is connected between an optical fiber and the first III-V waveguide 306a, and the second SSC 304b is connected between the dielectric waveguide 308 and the second III-V waveguide 306b.

In an embodiment, the first and second SSCs 304a and 304b receive corresponding input optical signals by way of the first and second SSCs 304a and 304b, respectively. In another embodiment, the first and second SSCs 304a and 304b provide corresponding output optical signals to the first and second optical fibers, respectively. The dielectric waveguide 308 is optically coupled to the first and second SSCs 304a and 304b by way of the first and second III-V waveguides 306a and 306b, respectively. The dielectric waveguide 308 is formed by etching the substrate 302 and depositing dielectric layers of different and controlled refractive indices. A mode in the dielectric waveguide 308 has $E_X$ and $E_Y$ field profiles that are similar to a mode within the III-V waveguides 306 that are coupled to the dielectric waveguide 308. The first III-V waveguide 306a optically connects the at least one active element 310 to the dielectric waveguide 308, and the second III-V waveguide 306b optically connects the at least one passive element 312 to the dielectric waveguide 308.

The at least one active element 310 and the at least one passive element 312 are formed over the substrate 302. In an example, the at least one active element 310 includes LEDs, semiconductor DFBs, semiconductor external cavity lasers (ECLs), fixed wavelength emitters, tunable emitters, photodetectors, integrated photodetectors, photodetectors with electrical amplification, photodetectors with electrical gain and logic generation circuits, p-n photodiodes, p-i-n photodiodes, avalanche photodiodes, metal-semiconductor-metal photodetectors, and optical receivers. In the example, the at least one passive element 312 includes a passive waveguide, a transition waveguide, and a grating such as an echelle grating, and an arrayed waveguide grating.

In one embodiment, the III-V waveguides 306 exploit adiabatic tapers to provide the corresponding SSCs 304 between a first optical mode geometry and a second optical mode geometry. The first optical mode geometry is that of the dielectric waveguide 308. In one embodiment, the second optical mode geometry is that of at least one of the first III-V waveguide 306a and the second III-V waveguide 306b. In another embodiment, the second optical mode geometry is one of a photodiode (not shown), an optical amplifier (not shown), and an optical emitter (not shown) that are optically coupled to the dielectric waveguide 308.

Within the wavelength ranges of interest for telecommunications, typically 1310 nm and 1550 nm, several dielectric materials can be exploited to provide the dielectric waveguide 308 including, for example, silica (silicon dioxide, $SiO_2$), silicon nitride ($Si_3N_4$), silicon oxynitride ($SiO_XN_Y$), and aluminum nitride (AlN). In some instances, absorption bands of the material, in an example, N—H bonds in $SiO_XN_Y$ and $Si_3N_4$ waveguides on silicon around 1520 nm, may lead to the use of the material at other wavelengths, e.g. 1310 nm. Within the following embodiments of the invention described and presented in respect of FIGS. 3 to 15, the PIC 300 is designed for operation at 1310 nm to support, for example 40GBASE-LR systems that exploit 4×10 Gb/s transmission over 10 km at 1310 nm using 4 CWDM wavelengths at λ=1270 nm; 1290 nm; 1310 nm; 1330 nm. However, embodiments of the invention exploiting other dielectrics and multi-layer dielectrics, annealed dielectrics, and the like may be implemented at 1550 nm as well as the E-, S- and L-bands. AN has been demonstrated to exhibit low loss at 1550 nm using magnetron based PECVD deposition allowing its use as an alternative to high index $Si_3N_4$ layers within embodiments of the invention presented below.

The temperature dependence of refractive index for Iridium Phosphide (InP), Silicon Nitride ($Si_3N_4$), Silica ($SiO_2$), aluminum nitride (AlN), and fluorinated polymer is shown in Table 1.

TABLE 1

Temperature dependence of InP and dielectric waveguide Materials

| Material | Refractive Index (λ = 1550 nm) | dn/dT (□ C.) |
|---|---|---|
| Indium Phosphide - InP | 3.48 | ≈2.3 × 10⁻⁴ |
| Silicon Nitride - $Si_3N_4$ | 2.05 | ≈4.0 × 10⁻⁵ |
| Silica - $SiO_2$ | 1.46 | ≈1.1 × 10⁻⁵ |
| Aluminum Nitride - AlN | 2.10 | ≈2.32 × 10⁻⁵ |
| Fluorinated Polymer | 1.38 | ≈-2.65 × 10⁻⁴ |

The effective refractive index of an optical waveguide, i.e., at least one of the first and second III-V waveguides 306a and 306b, and the dielectric waveguide 308, is determined by the core material, the cladding material, and the modal overlap with respect to the cladding. Accordingly, through the use of diffraction elements with multi-layer dielectrics, the overall temperature dependence of refractive index for the optical waveguide can be adjusted. The overall temperature dependent refractive index change for the optical waveguide is given by equation (2):

$$\frac{dn}{dT}(\text{Guide}) = \Gamma \cdot \frac{dn}{dT}(\text{Core}) + (1 - \Gamma) \cdot \frac{dn}{dT}(\text{Cladding}) \quad (2)$$

where, the fraction Γ of the optical mode propagates within the core and hence (1−Γ) propagates in the cladding. Equation (3) shows the overall temperature dependent refractive index change for the optical waveguide when the optical waveguide has first and second cladding materials.

$$\frac{dn}{dT}(\text{Guide}) = \quad (3)$$
$$\Gamma_{CORE} \cdot \frac{dn}{dT}(\text{Core}) + \Gamma_{Clad1} \cdot \frac{dn}{dT}(\text{Clad\_1}) + \Gamma_{Clad2} \cdot \frac{dn}{dT}(\text{Clad\_2})$$

If $$\frac{dn}{dT}(\text{Clad\_2}) < 0$$

then increasing the mode overlap to the polymer can reduce the temperature dependence.

However, absolute refractive index of InP is greater than the absolute refractive indices of $SiO_2$, $Si_3N_4$, and most polymers. Thus, the refractive index temperature coefficient of a waveguide can be varied according to the design of the dielectric waveguide 308.

Referring now to FIG. 3B, the optical receiver 314 used in the PIC 300 according to an embodiment of the present invention is shown. The optical receiver 314 includes an upper ridge waveguide 316, a first spacer layer 318, a transition waveguide 320, a second spacer layer 322, and a dilute waveguide 324. The second spacer layer 322 is deposited on the dilute waveguide 324, and the transition waveguide 320 is deposited on the second spacer layer 322. Further, the first spacer layer 318 is deposited on the transition waveguide 320, and the upper ridge waveguide 316 is deposited on the first spacer layer 318. The upper ridge waveguide 316 is formed using InGaAs, the transition waveguide 320 is formed using InGaAsP, and the dilute waveguide 324 includes multiple layers of InGaAsP. The transition waveguide 320 is used for routing the optical signal within the PIC 300. The transition waveguide 320 receives the optical signal and couples the optical signal to the upper ridge waveguide 316. The upper ridge waveguide 316 is a detector that generates electric signals corresponding to the optical signal. The dilute waveguide 324 is an InP waveguide that supports a large mode. The transition waveguide 320 receives a large optical mode from the dilute waveguide 324, and outputs a small optical mode. The optical mode conversion between the dilute waveguide 324 and the transition waveguide 320 is controlled by relative widths of the transition and dilute waveguides 320 and 324. The first and second spacer layers 318 and 322 are formed from III-V semiconductor materials. The first spacer layer 318 provides optical isolation between the ridge and transition waveguides 316 and 320, and the second spacer layer 322 provides optical isolation between the transition and dilute waveguides 320 and 324.

Figure 4B:
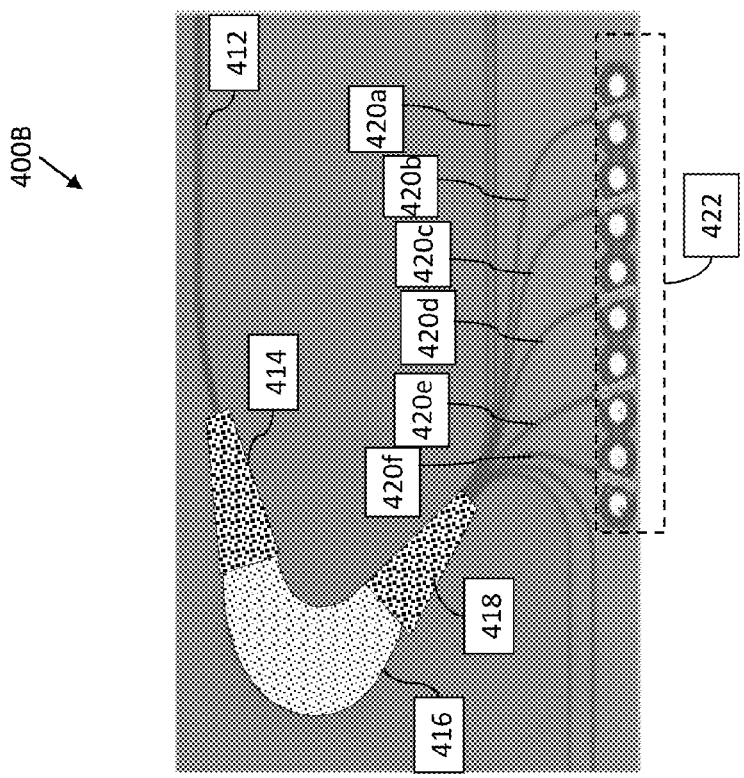
FIG. 4B is a top-view of the PIC of FIG. 3A in accordance with another embodiment of the present invention.
Figure 4A:
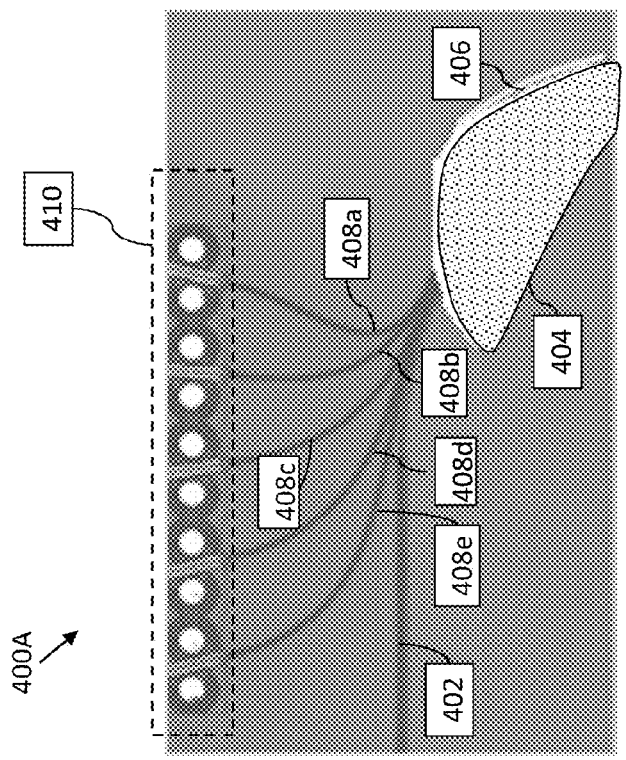
FIG. 4A is a top-view of the PIC of FIG. 3A in accordance with an embodiment of the present invention.

Referring now to FIG. 4A, a top-view of a PIC 400A according to an embodiment of the present invention is shown. The PIC 400A includes a compound semiconductor waveguide 402, a dielectric waveguide 404, an echelle grating 406 (also referred to as a "grating element 406"), and multiple output waveguides 408a-408e. In an embodiment, the PIC 400A is the PIC 300. Thus, the dielectric waveguide 404 is the dielectric waveguide 308 and the compound semiconductor waveguide 402 is at least one of the first and second III-V waveguides 306a and 306b. In one embodiment, the compound semiconductor waveguide 402 is coupled to at least one of first and second spot-size converters (SSCs) 304 for coupling to the optical fibers, respectively. The compound semiconductor waveguide 402 receives an input optical signal. The dielectric waveguide 404 is in optical contact to the compound semiconductor waveguide 402 for receiving and transmitting the input optical signal. In one embodiment of the present invention, the PIC 400A functions as an optical DMUX. The echelle grating 406 is in optical contact with the dielectric waveguide 404 for receiving the input optical signal. The echelle grating 406 receives the input optical signal and generates multiple output optical signals. The multiple output waveguides 408a-408e receive the corresponding output signals. The PIC 400A further includes an array of detector elements 410 that are in optical contact with the multiple output waveguides 408a-408e for receiving the corresponding multiple output optical signals. Each detector element of the array of detector elements 410 receives a corresponding output optical signal and generates a corresponding electrical signal.

In another embodiment of the present invention, the PIC 400A functions as an optical MUX. The multiple output waveguides 408a-408e receive and transmit corresponding multiple input optical signals. The dielectric waveguide 404 receives and transmits the multiple input optical signals. The echelle grating 406 receives and combines the multiple input optical signals and generates an output optical signal. The compound semiconductor waveguide 402 receives and transmits the output optical signal.

Referring now to FIG. 4B, a top-view of a PIC 400B according to another embodiment of the present invention is shown. The PIC 400B includes a compound semiconductor waveguide 412, a first dielectric waveguide 414, an arrayed waveguide grating (AWG) 416, a second dielectric waveguide 418, first through sixth output waveguides 420a-420f, and an array of detector elements 422. In an embodiment, the PIC 400B is the PIC 300. Thus, the first and second dielectric waveguides 414 and 418 is the dielectric waveguide 308 and the compound semiconductor waveguide 412 is at least one of the first and second III-V waveguides 306a and 306b. Thus, the compound semiconductor waveguide 412 couples to the first and second SSCs 304a and 304b. In presently preferred embodiment, the compound semiconductor waveguide 402 is formed using a III-V semiconductor material. At least one of the first and second SSCs 304a and 304b couples to at least one of single mode and multimode optical fibers for receiving an input optical signal. The AWG 416 is formed from dielectric materials such as $SiO_2$ and $Si_3N_4$. In one embodiment of the present invention, the PIC 400B functions as an optical demultiplexer. The first dielectric waveguide 414 is in optical contact with the compound semiconductor waveguide 412 for receiving the input optical signal. The first dielectric waveguide 414 transmits the input optical signal. The AWG 416 is in further contact with the first dielectric waveguide 414 for receiving the input optical signal. The AWG 416 generates multiple output optical signals. The second dielectric waveguide 418 receives and transmits the multiple output optical signals. The multiple output waveguides 420 receive and transmit corresponding output optical signals. The array of detector elements 422 are in optical contact with the multiple output waveguides 420 for receiving the multiple output optical signals. Each detector element of the array of detector element 420 generates an electrical signal based on corresponding output optical signal.

In another embodiment of the present invention, the PIC 400B functions as an optical multiplexer. The multiple output waveguides 420 receive and transmit corresponding input optical signals. The second dielectric waveguide 418 receives and transmits the multiple input optical signals. The AWG 416 receives and combines the multiple input optical signals and generates an output optical signal. Further, the compound semiconductor waveguide 402 receives and transmits the output optical signal.

Figures 5A, 5B:
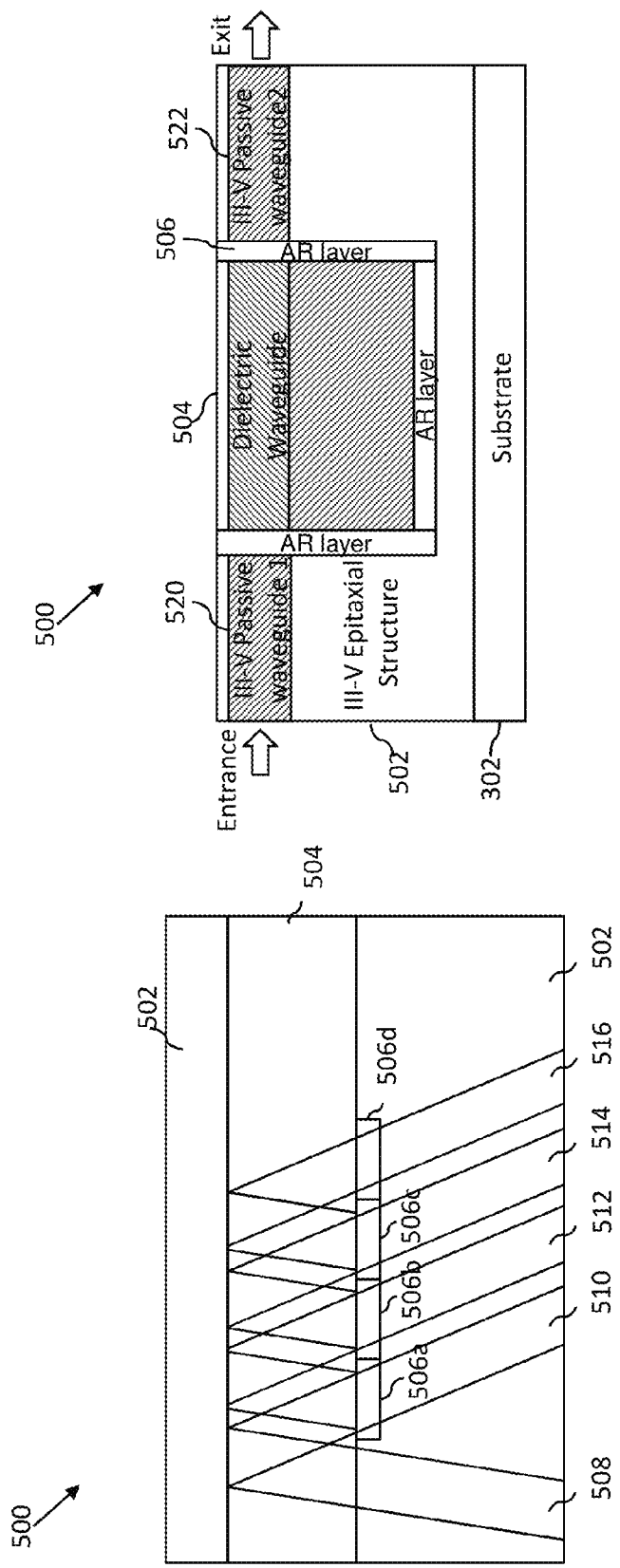
FIG. 5A is a top-view of a dielectric "zig-zag" waveguide with thin-film filters on the PIC of FIG. 3A in accordance with another embodiment of the present invention.
FIG. 5B is a cross-sectional view of the dielectric waveguide of FIG. 5 with an anti-reflection layer in accordance with another embodiment of the present invention.

Referring now to FIG. 5A, a top view of a PIC 500 in accordance with another embodiment of the present invention is shown. In the embodiment, the PIC 500 is the PIC 300. The PIC 500 includes a III-V structure 502 and a dielectric "zig-zag" waveguide 504. The PIC 500 further includes first to fourth dielectric filters 506a-506d deposited on the sidewall of the III-V structure 502. An input beam 508 having multiple wavelengths is incident on the dielectric waveguide 504. The input beam 508 is reflected at an interface between the dielectric waveguide 504 and the III-V structure 502. The input beam 508 is incident on the first dielectric filter 506a by way of the dielectric waveguide 504. The first dielectric filter 506a separates a first wavelength of the input beam 508 and transmits the input beam having the first wavelength 510. The filtered input beam 508 is transmitted to the second dielectric filter 506b. The second dielectric filter 506b separates a second wavelength of the input beam 512 and transmits the input beam having the second wavelength 512. The filtered input beam 508 is transmitted to the third dielectric filter 506c. Similarly, the third and fourth dielectric filters 506c and 506d separate third and fourth wavelengths of the input beam 508, and transmit the input beams having third and fourth wavelengths 514 and 516, respectively.

Referring now to FIG. 5B, a side view of the PIC 500 of FIG. 5A in accordance with another embodiment of the present invention is shown. The FIG. 5B shows the substrate 302 upon which the III-V structure 502 is epitaxially grown. The III-V structure 502 is etched to deposit the dielectric waveguide 504. The III-V structure 502 includes first and second passive waveguides 520 and 522.

Figure 6A:
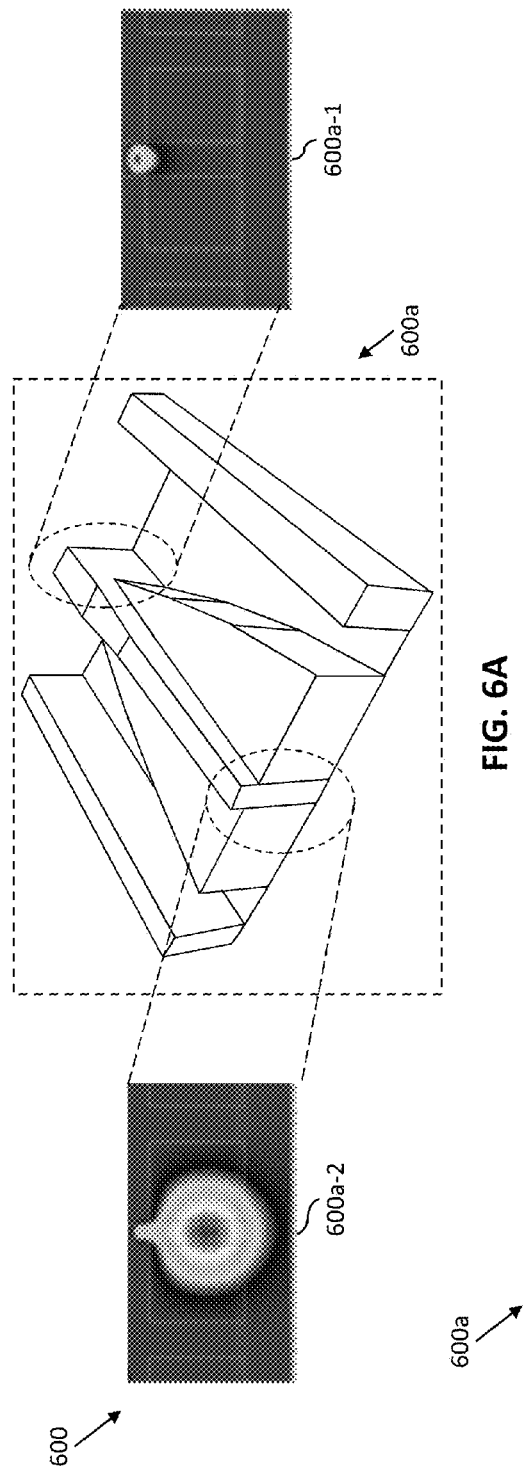
FIG. 6A is a cross-sectional view of an optical spot size converter (SSC) in accordance with an embodiment of the present invention.

Referring now to FIG. 6A, a cross-sectional view of an optical SSC 600a according to an embodiment of the present invention is shown. In an embodiment, the optical SSC 600a is at least one of the first and second SSCs 304a and 304b of FIG. 3. In one embodiment of the present invention, the optical SSC 600a is connected between the optical fibers and the PIC 300 that uses dielectric-on-InP waveguide sections for wavelength division multiplexing and demultiplexing. In another embodiment of the present invention, the optical SSC 600a is connected between the first and second III-V waveguides 306a and 306b, and the dielectric waveguide 308. The optical SSC 600a couples a small mode at one end as shown in the image 600a-1 to a large diluted optical mode at the other end as shown in the image 600a-2. Thus, the optical SSC 600a couples the highly confined mode of III-V waveguides 306 to a lower confinement mode of optical fibers.

Figure 6C:
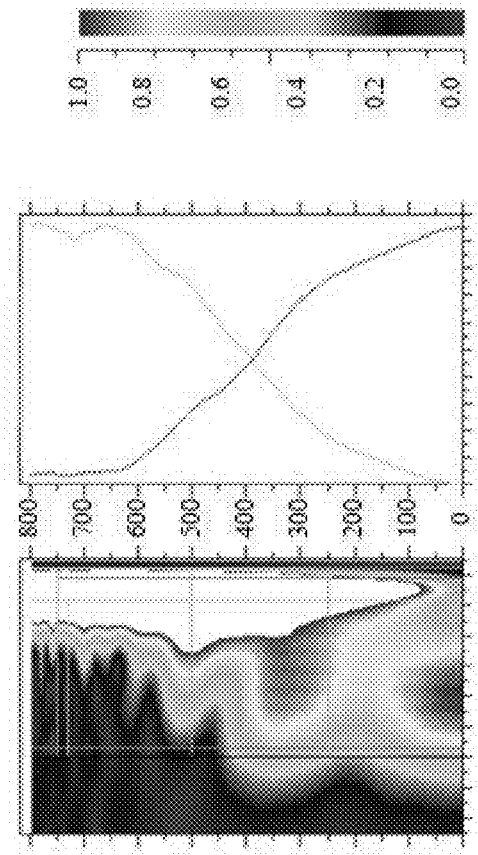
FIG. 6C is a contour plot and power curves of a mode of the optical SSC of FIG. 6A in accordance with an embodiment of the present invention.
Figure 6B:
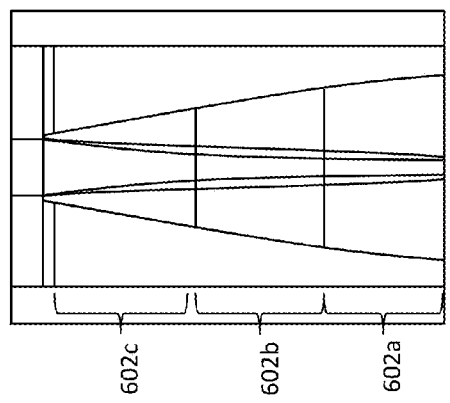
FIG. 6B is a top-view of the optical SSC of FIG. 6A in accordance with an embodiment of the present invention.

Referring now to FIG. 6B, a top-view of the optical SSC 600a according to an embodiment of the present invention is shown. The optical SSC 600a includes three sections 602a-602c. The design parameters for the optical SSC 600a are presented in Table 2.

layer 708c, and a third $SiO_{X3}N_{Y3}$ layer 708d. The first $SiO_{X1}N_{Y1}$ layer 708b of thickness $d_{SiON-1}$ with refractive index of $n_{SiON-1}$=1.55 (λ=1310 nm) is deposited over the thin $SiO_2$ layer 708a. The second $SiO_{X2}N_{Y2}$ layer 708c of thickness $d_{SiON-2}$ with refractive index of $n_{SiON-2}$=1.95 (λ=1310 nm) is deposited over the first $SiO_{X1}N_{Y1}$ layer 708b, and a third $SiO_{X3}N_{Y3}$ layer 708d of thickness $d_{SiON-3}$ with refractive index of $n_{SiON-3}$=1.85 (λ=1310 nm) is deposited over the second $SiO_{X2}N_{Y2}$ layer 708c. The thin $SiO_2$ layer 708a and the first through third SiON layers 708b-708d form the dielectric waveguide 708. Further, the first through third SiON layers 708b-708d form a lower cladding, core, and an upper cladding of the dielectric waveguide 708, respectively. The PIC 300 further includes a polymer layer 710 deposited above the upper cladding 708d of the dielectric waveguide 708. The polymer coating 710 has a negative thermal coefficient of the refractive index that reduces the temperature dependent refractive index variation of the PIC 300. The metal layer 706 defines a boundary condition for an electric field at the interface between the InP structure 704 and the dielectric waveguide 708. The metal layer 706 changes the Ex and Ey conditions for the electric field at the

TABLE 2

| Design Parameters of optical SSC 600a | | | | | | | | | |
|---|---|---|---|---|---|---|---|---|---|
| | Section 1 (602a) | | | Section 2 (602b) | | | Section 3 (602c) | | |
| | Etch 1 | Etch 2 | Etch 3 | Etch 1 | Etch 2 | Etch 3 | Etch 1 | Etch 2 | Etch 3 |
| Start | | 0 | | | 250 μm | | | 250 μm | |
| End | | 250 μm | | | 500 μm | | | 750 μm | 730 μm |
| Start Width | 2.0 μm | 1.2 μm | 15 μm | 2.2 μm | 1.4 μm | 12 μm | 2.2 μm | 1.4 μm | 8 μm |
| End Width | 2.2 μm | 1.4 μm | 12 μm | 2.2 μm | 1.4 μm | 8 μm | 3 μm | 3 μm | 4 μm |
| Function | | Linear | | | Linear | | | Exponential | Linear |
| Length | | 250 μm | | | 250 μm | | | 750 μm | 730 μm |

Referring now to FIG. 6C, the contour plot and power curves of a mode of the optical SSC 600a that evolves from the large buried mode to the small mode in accordance with an embodiment of the present invention are shown.

Figure 7:
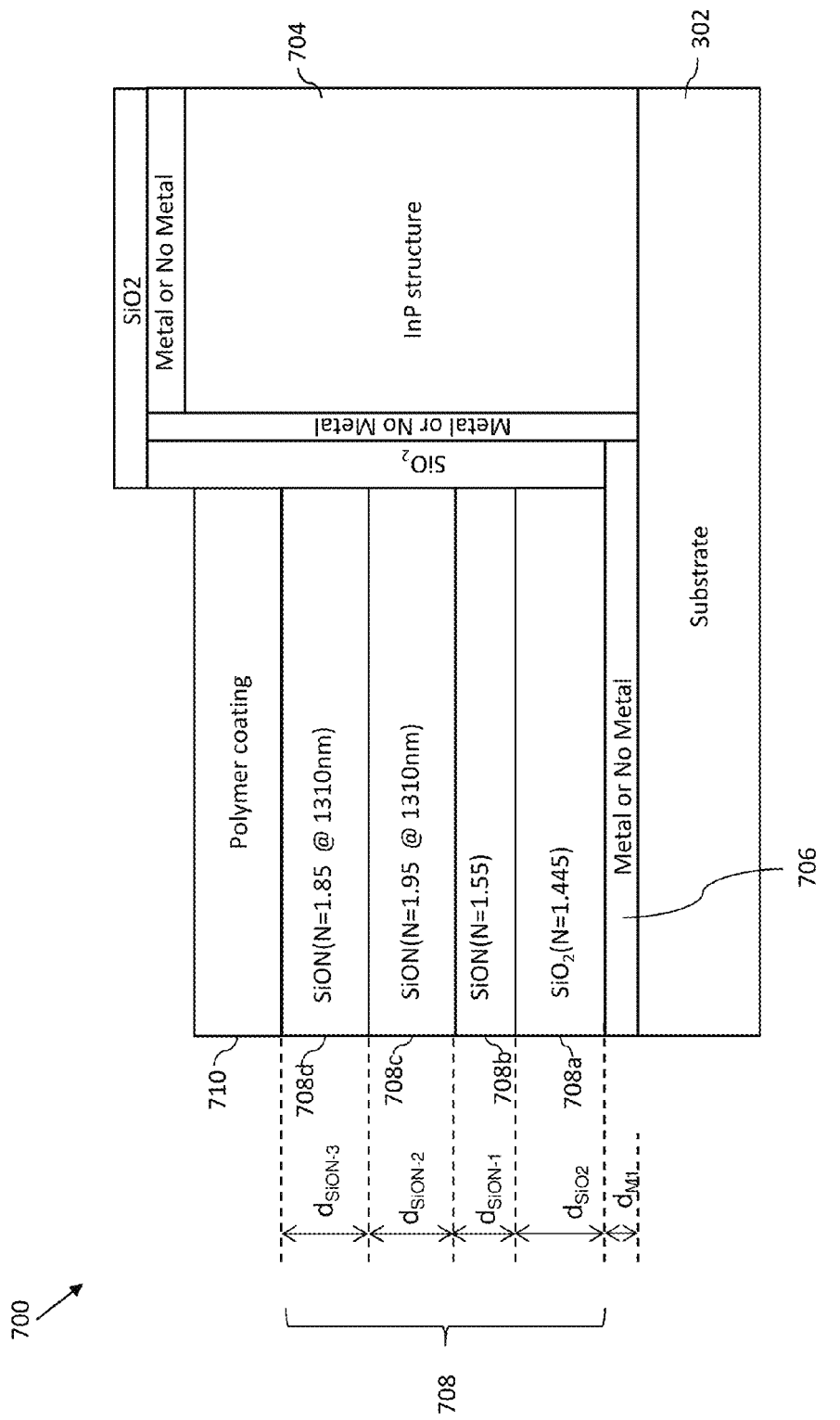
FIG. 7 is a cross-section of a waveguide structure of the PIC of FIG. 3A that exploits low stress $SiO_xN_Y$ optical waveguide sections in accordance with an embodiment of the present invention.

Referring now to FIG. 7, a cross-section of the PIC 300 that exploits low stress $SiO_XN_Y$ optical waveguide sections in accordance with an embodiment of the present invention is shown. A substrate 302 formed using a III-V semiconductor material is etched to form a III-V structure 704. In an embodiment, the III-V structure 704 is an InP structure 704. The InP structure 704 is at least one of the grating element 406, the grating element 416, the first and second passive waveguides 520 and 522, and the III-V waveguides 306. In one embodiment, the InP structure 704 is metallized with a metal layer 706. In an example, the metal layer 706 includes gold, chromium, aluminum, silver, platinum, nickel, copper, rhodium, palladium, tungsten, and combinations of such materials. A dielectric waveguide 708 including multiple layers of dielectric material are deposited over the etched portion of the substrate 302. The dielectric waveguide 708 is at least one of the dielectric waveguide 404, the arrayed waveguide grating 416, and the first and second dielectric waveguides 414 and 418. The multiple layers of dielectric waveguide 708 include a thin $SiO_2$ layer 708a (also referred to as "λ/4 dielectric layer 708a") of thickness $d_{SiO2}$ with refractive index $n_{SiO2}$=1.445 deposited over the metal layer 706. The λ/4 dielectric layer 708a provides a low reflection coefficient between the InP structure 704 and the dielectric waveguide 708. The multiple layers further include a first Silicon Nitride ($SiO_{X1}N_{Y1}$) layer 708b, a second $SiO_{X2}N_{Y2}$ interface between the dielectric waveguide 708 and the InP structure 704. The metal layer 706 acts as a "mirror" surface that reflects an optical signal propagating through the dielectric waveguide 708. In another embodiment, the metal layer 706 on the substrate 302 may be removed prior to depositing the dielectric waveguide 708. The dielectric waveguide 708 are deposited on a patterned metal layer 708 such that the thickness of the patterned metal layer 708 is thin enough to have low loss at the tail of the $E_x$ and $E_y$ fields as to have low absorption of the optical signal.

In several other embodiments, the dielectric waveguide 708 may be a buried waveguide, i.e., within a buried heterostructure device. In one embodiment, the buried heterostructure device includes P—N junction blocking layers. Further, selective area growth techniques are employed for depositing the buried waveguide.

Figure 8:
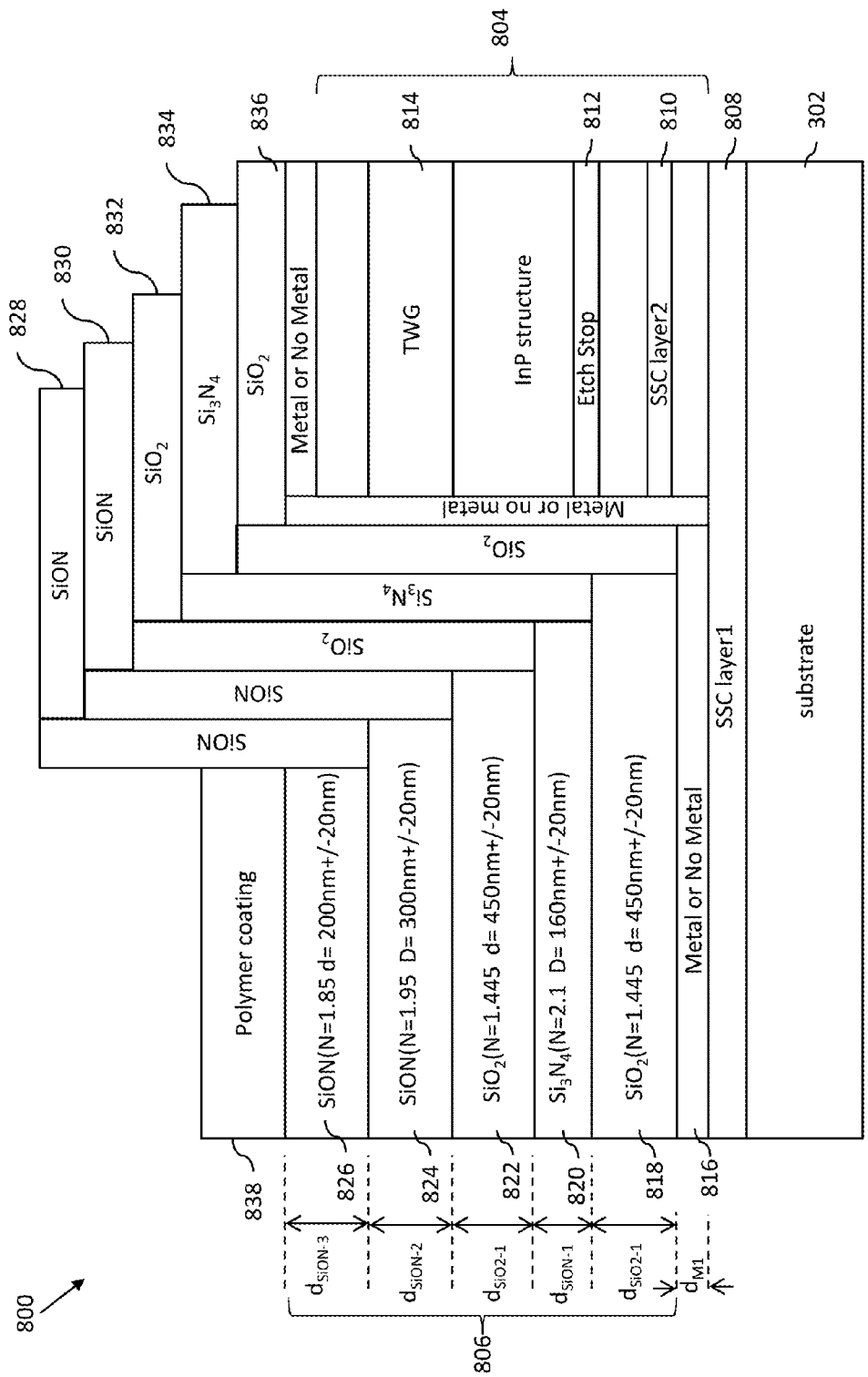
FIG. 8 is a cross section of a waveguide structure of the PIC of FIG. 3A exploiting $Si_3N_4$-on-InP optical waveguide sections with anti-reflection coating in accordance with another embodiment of the present invention.

Referring now to FIG. 8, a cross-section of a waveguide structure 800 of the PIC 300 exploiting an $SiO_XN_Y$ optical waveguide section in accordance with another embodiment of the present invention is shown. A substrate 302 formed using a III-V semiconductor material is etched to form a III-V structure 804. In an embodiment, the III-V structure 804 is an InP structure 804. The InP structure 804 has a multi-layer structure that includes a first SSC layer 808, a second SSC layer 810, an etch stop layer 812, and a thin waveguide (TWG) layer 814. The first and second SSC layers 808 and 810 are Indium gallium arsenide phosphide (InGaAsP) layers. The first SSC layer 808 is an etch stop layer for deposition of the dielectric waveguide 806 and the second SSC layer 810 is a passive waveguide. The TWG layer 814 is formed using a III-V semiconductor material. In an example, the III-V material of the TWG layer 814 is at least one of InGaAsP and InGaAlAs. The TWG layer 814 transmits an optical signal received through the dielectric waveguide 806.

Subsequently, the dielectric waveguide 806 is grown at the sidewalls of the InP structure 804. The dielectric waveguide 806 as defined in Table 3 is deposited and patterned atop a metal layer 816. The metal layer 816 is deposited on the first SSC layer 808 and the sidewall of the InP structure 804. The metal layer 816 is a patterned such that the thickness of the patterned metal layer 816 is thin enough to have low loss of the optical signal.

In an embodiment, the dielectric waveguide 806 is a slab waveguide of the Echelle grating 406. The substrate 302 is etched such that the edge of the opening provides the InP structure 804 of the echelle grating 406. The dielectric waveguide 806 includes multiple layers that are deposited within the etched portion of the substrate 302. The metal layer 816 is deposited at the sidewall of the echelle grating 406 to reflect an optical signal transmitted through the dielectric waveguide 806. In the embodiment, the InP structure 804 does not include the TWG layer 814.

TABLE 3

Dielectric Waveguide Structure

| Layer | Material | Refractive Index | Thickness |
|---|---|---|---|
| 818 | $SiO_2$ | 1.445 | 450 nm ± 20 nm |
| 820 | $Si_3N_4$ | 2.1 | 160 nm ± 20 nm |
| 822 | $SiO_2$ | 1.445 | 450 nm ± 20 nm |
| 824 | $SiO_{X1}N_{Y1}$ | 1.95 | 300 nm ± 20 nm |
| 826 | $SiO_{X2}N_{Y2}$ | 1.85 | 200 nm ± 20 nm |

The SiON (N=1.95) is a core of the dielectric waveguide 806. In another embodiment, the dielectric waveguide 806 is a slab waveguide of the PIC 400B, and the InP structure 804 is at least one of input and output waveguides of the PIC 400B. The InP structure 804 includes the TWG layer 814, and the metal layer 816 is not deposited on the sidewall of the InP structure 804. The TWG 814 transmits the optical signal received through the dielectric waveguide 806. In yet another embodiment, the InP structure 804 is a passive waveguide of the PIC 300.

The dielectric waveguide 806 is tailored not only for desired optical waveguide parameters but also so that the multiple layers forming the dielectric waveguide 806 act as anti-reflection coating. The dielectric layers 806 extend on the sidewalls of the InP structure 804 to provide the anti-reflection coating. The anti-reflection coating including multiple anti-reflection layers 828-836. The anti-reflection layers 828-836 include a silicon di-oxide ($SiO_2$) layer 836, a silicon nitride ($Si_3N_4$) layer 834 adjacent to the $SiO_2$ layer 836, a silicon di-oxide ($SiO_2$) layer 832 adjacent to the $Si_3N_4$ layer 834, a silicon-oxynitride (SiON) layer 830 adjacent to the $SiO_2$ layer 832, and a SiON layer 828 adjacent to the SiON layer 832. The PIC 300 further includes a polymer layer 838 deposited above the dielectric waveguide 806. The polymer coating 838 has a negative thermal coefficient of the refractive index to reduce the temperature dependent refractive index variation of the PIC 300.

Figure 9:
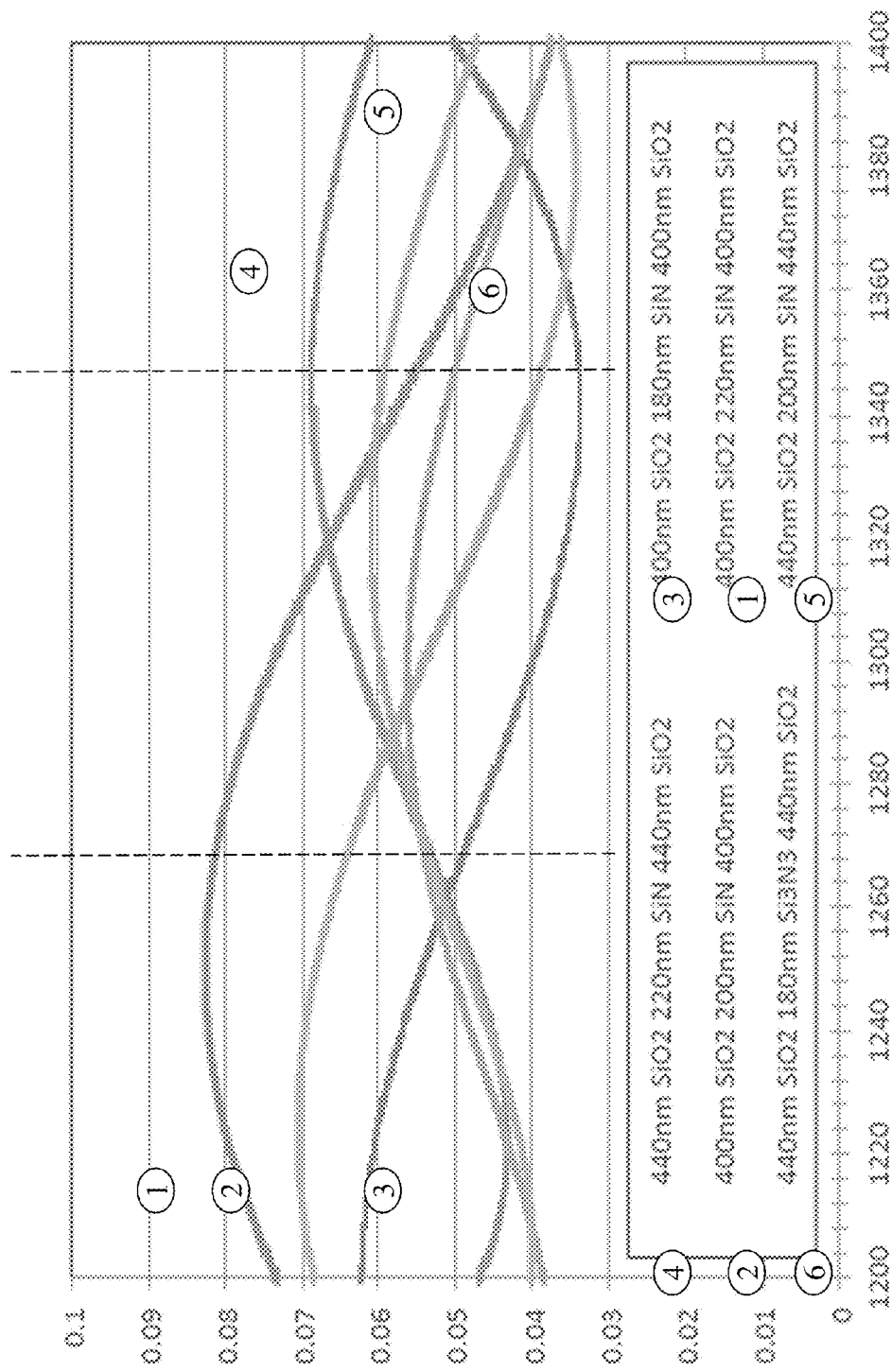
FIG. 9 is a graph showing simulations of optical reflectivity of $SiO_2$-on-InP optical waveguide with $Si_3N_4$ interference layer modeled on $SiO_2$ in accordance with another embodiment of the present invention.

Referring now to FIG. 9, simulations of optical reflectivity over the wavelength range 1200 nm≤λ≤1400 nm of the optical waveguide structure 800 according to an embodiment of the invention is shown. For the wavelength range 1270 nm≤$\lambda_{DESIGN}$≤1340 nm, the best reflectivity is ~0.55 for configuration "6" comprising 440 nm:$SiO_2$|180 nm:$Si_3N_4$|440 nm:$SiO_2$. The inherent reflectivity of an SiO2:InP interface being ~0.13.

Figure 10:
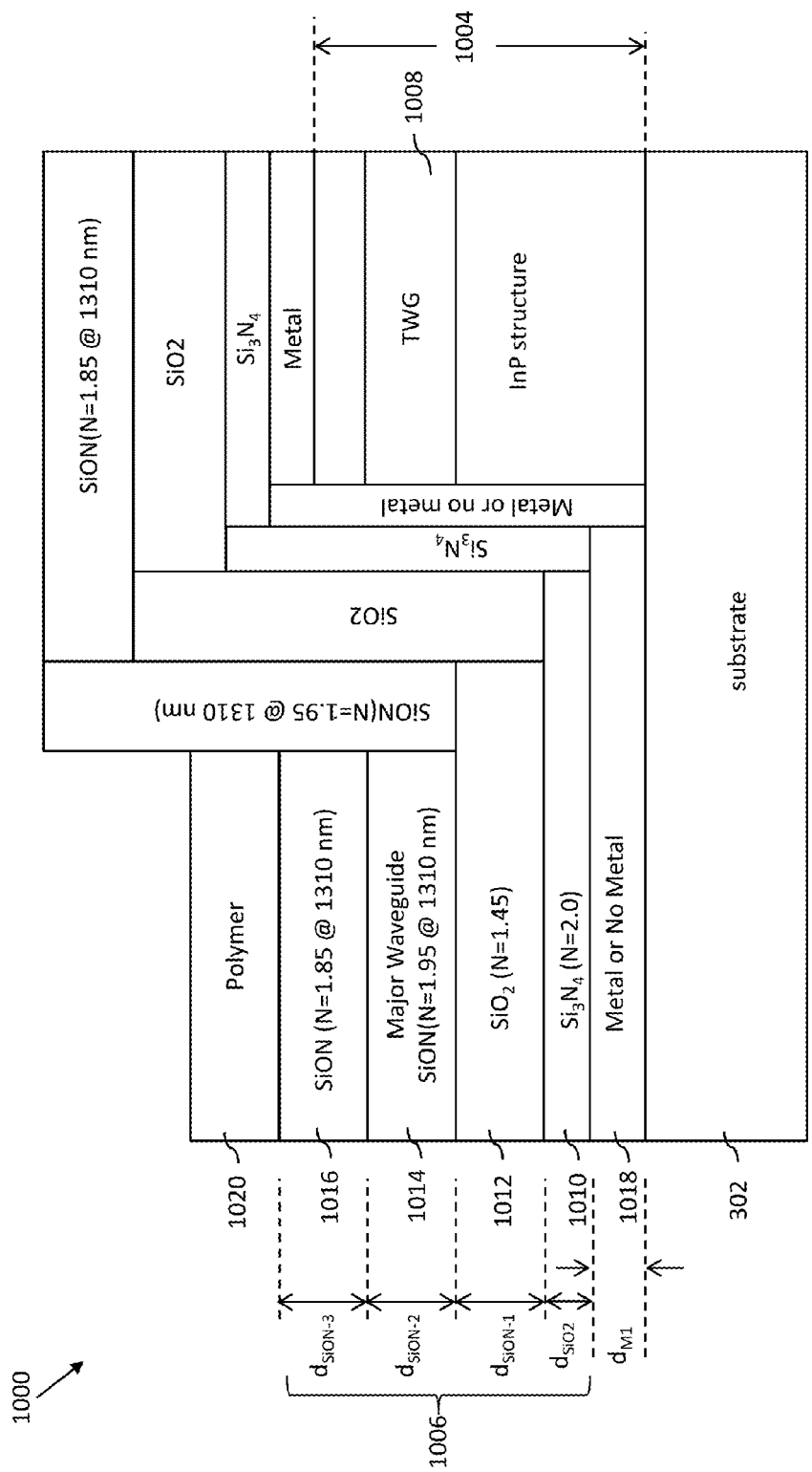
FIG. 10 is a cross section of a waveguide structure of the PIC of FIG. 3A exploiting $SiO_xN_Y$-on-InP optical waveguide sections with $SiO_2$—$Si_3N_4$ reflectivity reduction structures in accordance with another embodiment of the present invention.

Referring now to FIG. 10, a cross-section of a waveguide structure 1000 of the PIC 300 exploiting an $SiO_XN_Y$ optical waveguide section in accordance with another embodiment of the present invention is shown. The waveguide structure 1000 is formed on the substrate 302. The substrate 302 formed using a III-V semiconductor material is etched to form a III-V structure 1004. In an embodiment, the III-V structure 1004 is an InP structure 1004. The waveguide structure 1000 includes a dielectric waveguide 1006 which corresponds to the dielectric waveguide 308.

The anti-reflection coating is formed at the interface between the dielectric waveguide 1006 and the InP structure 1004. The substrate 302 has multiple layers deposited within an opening etched in the substrate 302 such that the edge of the opening provides the InP structure 1004 of the grating element 406. The InP structure 1004 includes a TWG layer 1008.

The substrate 302 is etched to form the InP structure 1004. The dielectric waveguide 1006 is grown within the opening and the sidewalls of the InP structure 1004. The dielectric waveguide 1006 includes multiple layers 1010-1016 of the dielectric material which are defined in Table 4. In an embodiment, a metal layer 1018 is deposited on the etched portion of the substrate 302 and the sidewalls of the InP structure 1004. In another embodiment, the metal layer 1018 is etched off prior to the deposition of the dielectric waveguide 1006. The metal layer 1018 defines boundary condition for an electric field at an interface between the InP structure 1004 and the dielectric waveguide 1006. The metal layer 1018 changes the Ex and Ey conditions for the electric field at the interface between the dielectric waveguide 1006 and the InP structure 1004. The metal layer 1018 acts as a "mirror" surface that reflects an optical signal propagating through the dielectric waveguide 1006. The dielectric waveguide 1006 is deposited on the metal layer 1018. In one embodiment, the InP structure 1004 is the echelle grating 406. The metal layer 1018 is deposited on the sidewall of the echelle grating 406 to reflect an optical signal transmitted through the dielectric waveguide 1006. Further, the InP structure 1004 does not include the TWG 1008. In another embodiment, the dielectric waveguide 1006 is a slab waveguide of the PIC 400B, and the InP structure 1004 is at least one of input and output waveguides of the PIC 400B. The metal layer 1018 is not deposited at the sidewall of InP structure 1004 and the TWG 1008 is present in the InP structure 1004 to transmit the optical signal received through the dielectric waveguide 1006. In yet another embodiment, the InP structure 1004 is a passive waveguide of the PIC 300. The metal layer 1018 is not deposited at the sidewall of InP structure 1004, and the TWG 1008 is present in the InP structure 1004 to transmit the optical signal received through the dielectric waveguide 1006. The waveguide structure 1000 further includes a polymer layer 1020 deposited above the dielectric waveguide 1006. The polymer coating 1020 has a negative thermal coefficient of the refractive index that reduces the temperature dependent refractive index variation of the PIC 300.

The dielectric waveguide 1006 is tailored not only for desired optical waveguide parameters but also so that the multiple layers forming the dielectric waveguide 1006 on the sidewalls of the InP structure 1004 act as an anti-reflection coating. The SiON (N=1.95) is a core of the dielectric waveguide 1014.

TABLE 4

Multiple layers of Dielectric Waveguide

| Layer | Material | Refractive Index |
|---|---|---|
| 1010 | $Si_3N_4$ | 2.0 |
| 1012 | $SiO_2$ | 1.45 |
| 1014 | $SiO_{X1}N_{Y1}$ | 1.95 |
| 1016 | $SiO_{X2}N_{Y2}$ | 1.85 |

Figure 11:
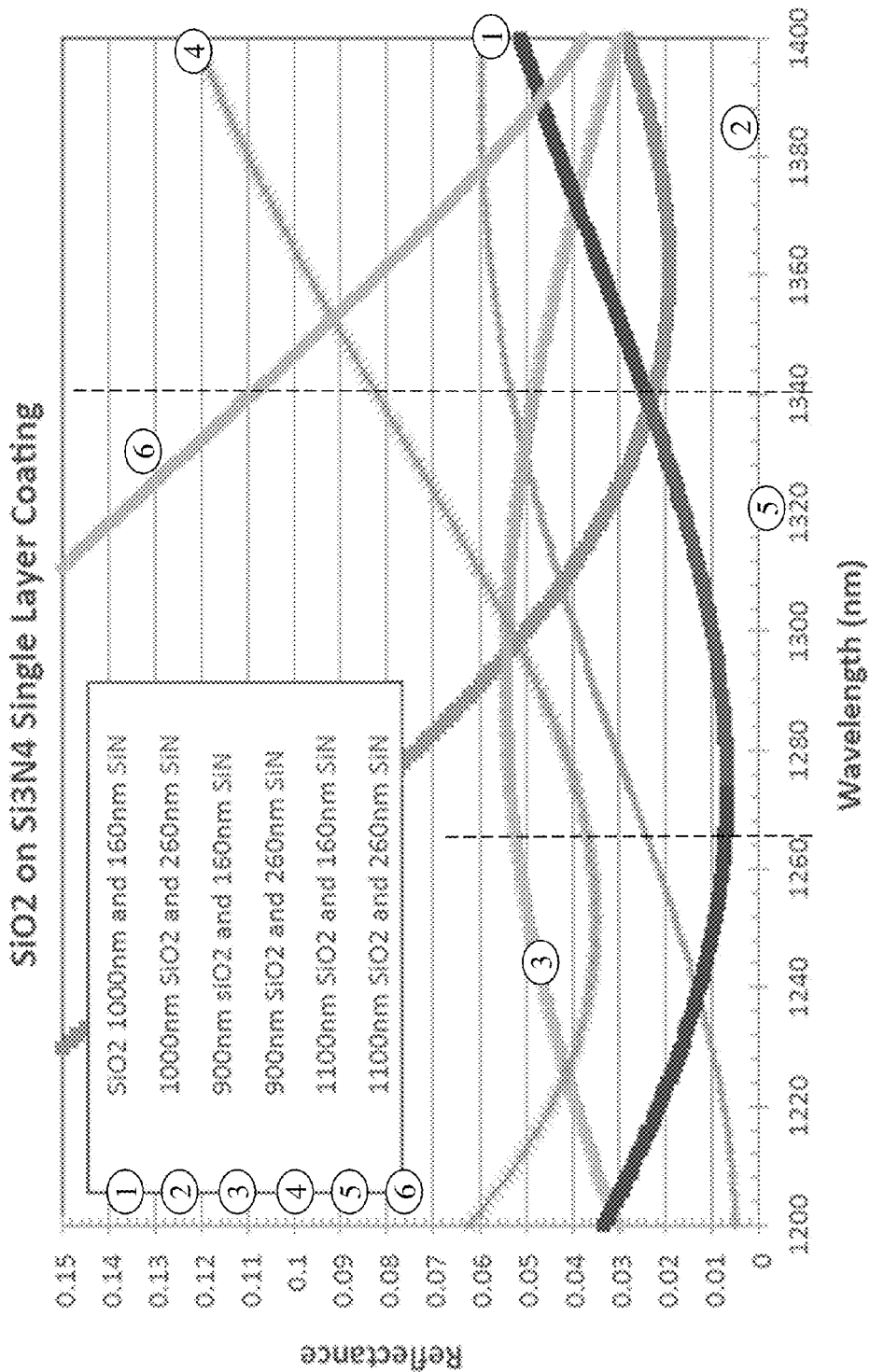
FIG. 11 is a graph showing simulations of optical reflectivity of the $SiO_xN_Y$-on-InP optical waveguide sections with $SiO_2$—$Si_3N_4$ reflectivity reduction structures of FIG. 10 in accordance with another embodiment of the present invention.

Referring now to FIG. 11, simulations of optical reflectivity over the wavelength range 1200 nm≤λ≤1400 nm of the optical waveguide structure 1010 that include $SiO_xN_Y$ with $SiO_2$ on a single $Si_3N_4$ interference layer according to an embodiment of the invention are shown. Across the stated wavelength range supra of 1270 nm≤$\Delta_{DESIGN}$≤1340 nm the best reflectivity is ~0.02 for configuration "5" comprising 1100 nm:$SiO_2$|160 nm:$Si_3N_4$.

Figure 12:
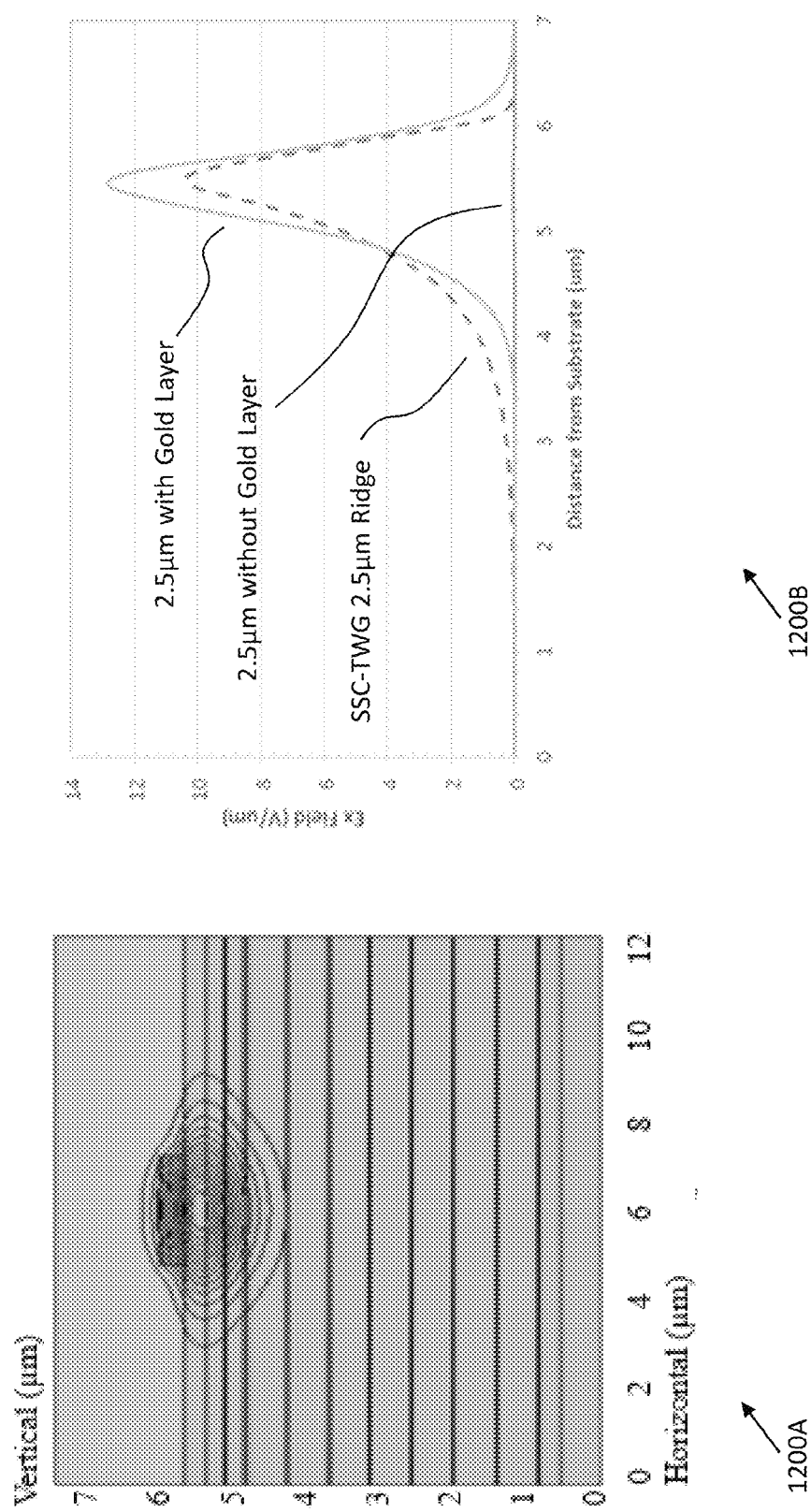

FIGS. 12 and 13 depict optical modelling results for a waveguide structure 800 having the structure presented in Table 5 according to an embodiment of the present invention.

TABLE 5

Detailed Waveguide Structure for Dielectric Waveguide on InP with SSC Converters

| Material | Thickness (μm) | Refractive Index | Layer |
|---|---|---|---|
| $SiO_2$ |  | 1.45 |  |
| $SiO_{X1}N_{Y1}$ | 0.050 | 1.75 | InP n-contact |
| $SiO_{X1}N_{Y1}$ | 0.100 | 1.75 | Q1.1 n-contact |
| $SiO_{X1}N_{Y1}$ | 0.200 | 1.75 | InP spacer |
| $SiO_{X2}N_{Y2}$ | 0.300 | 1.95 | TWG |
| $SiO_{X3}N_{Y3}$ | 0.250 | 1.85 | InP spacer |
| $SiO_{X3}N_{Y3}$ | 0.025 | 1.85 | Etch stop |
| $SiO_{X1}N_{Y1}$ | 0.250 | 1.75 | InP spacer |
| $SiO_{X1}N_{Y1}$ | 0.035 | 1.75 | Diluted SSC Q guide |
| $SiO_{X1}N_{Y1}$ | 0.532 | 1.75 | Diluted SSC InP guide |
| $SiO_{X4}N_{Y4}$ | 0.035 | 1.65 | Diluted SSC Q guide |
| $SiO_{X4}N_{Y4}$ | 0.532 | 1.65 | Diluted SSC InP guide |
| $SiO_2$ | 0.035 | 1.45 |  |
| $SiO_2$ | 0.532 | 1.45 |  |
| $SiO_2$ | 0.035 | 1.45 | Diluted SSC Q guide |
| InP | 0.535 | 3.1992 | Diluted SSC InP guide |
| Q1.05 | 0.035 | 3.3064 | Diluted SSC Q guide |
| Repeat InP and Q1.05 Three Times (4 Sets in Total) | | | |
| InP | 0.3000 | 3.1992 | InP buffer |
| InP | 0.532 | 3.1992 | Substrate |

Total Etch = 2.911 μm

FIG. 12 presents finite element modelling (FEM) of the cross-section of the waveguide structure 800 in first image 1200A and depicts the vertical optical mode profile for the SSC-TWG 2.5 μm Ridge, 2.5 μm Ridge without gold metallization layer, and 2.5 μm Ridge with gold metallization layer in second image 1200B. Image 1300A shows a plan view that includes a dielectric waveguide 1302 and an InP ridge 1304. Images 1300B and 1300C represent a cross-sectional FEM analysis of the InP ridge 1304 and the dielectric waveguide 1302, respectively.

Figure 14:
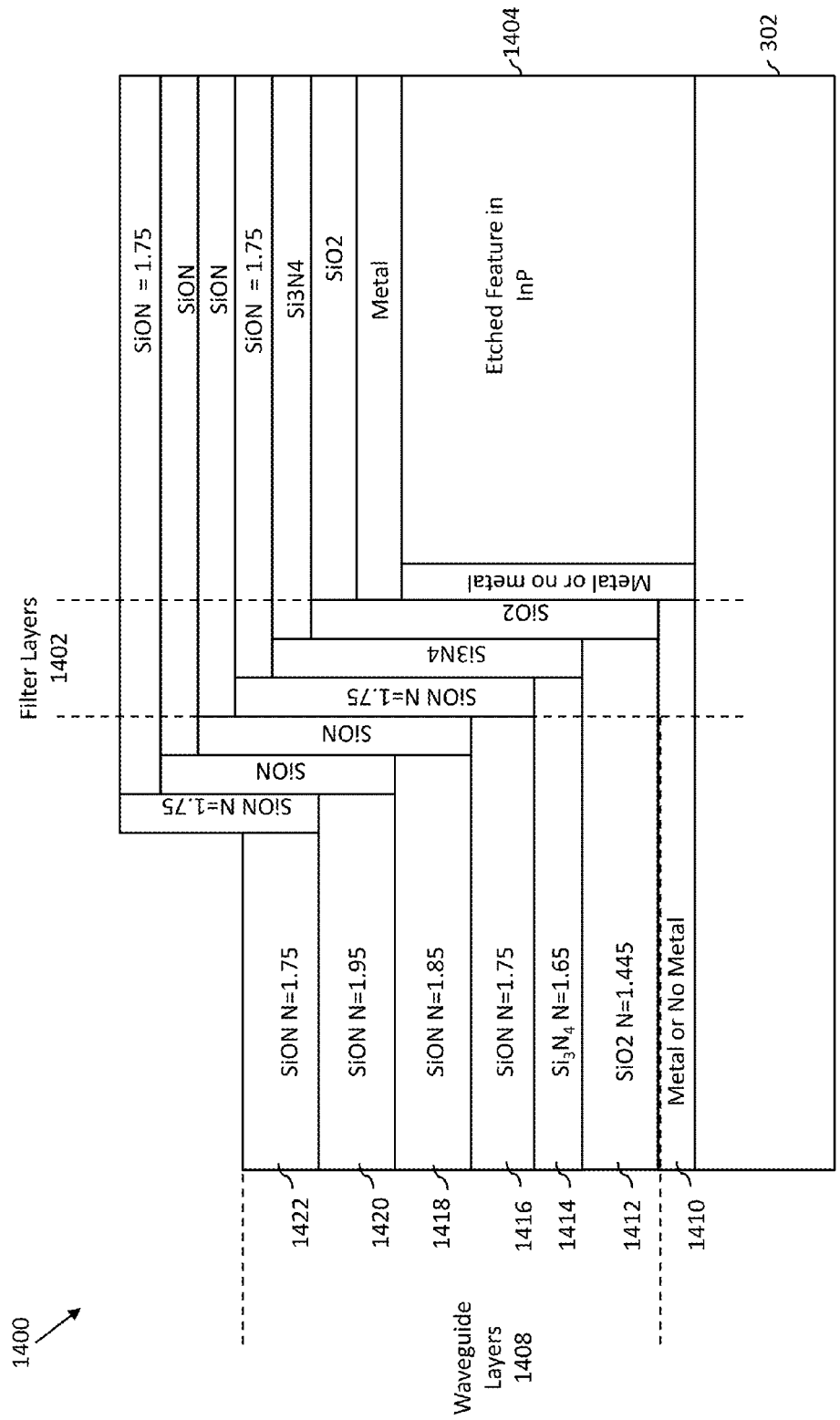
FIG. 14 is a cross section of a waveguide structure of the PIC of FIG. 3A exploiting $SiO_xN_Y$-on-InP optical waveguide sections with $SiO_2$—$SiO_xN_Y$ filters in accordance with another embodiment of the present invention.
Figure 15:
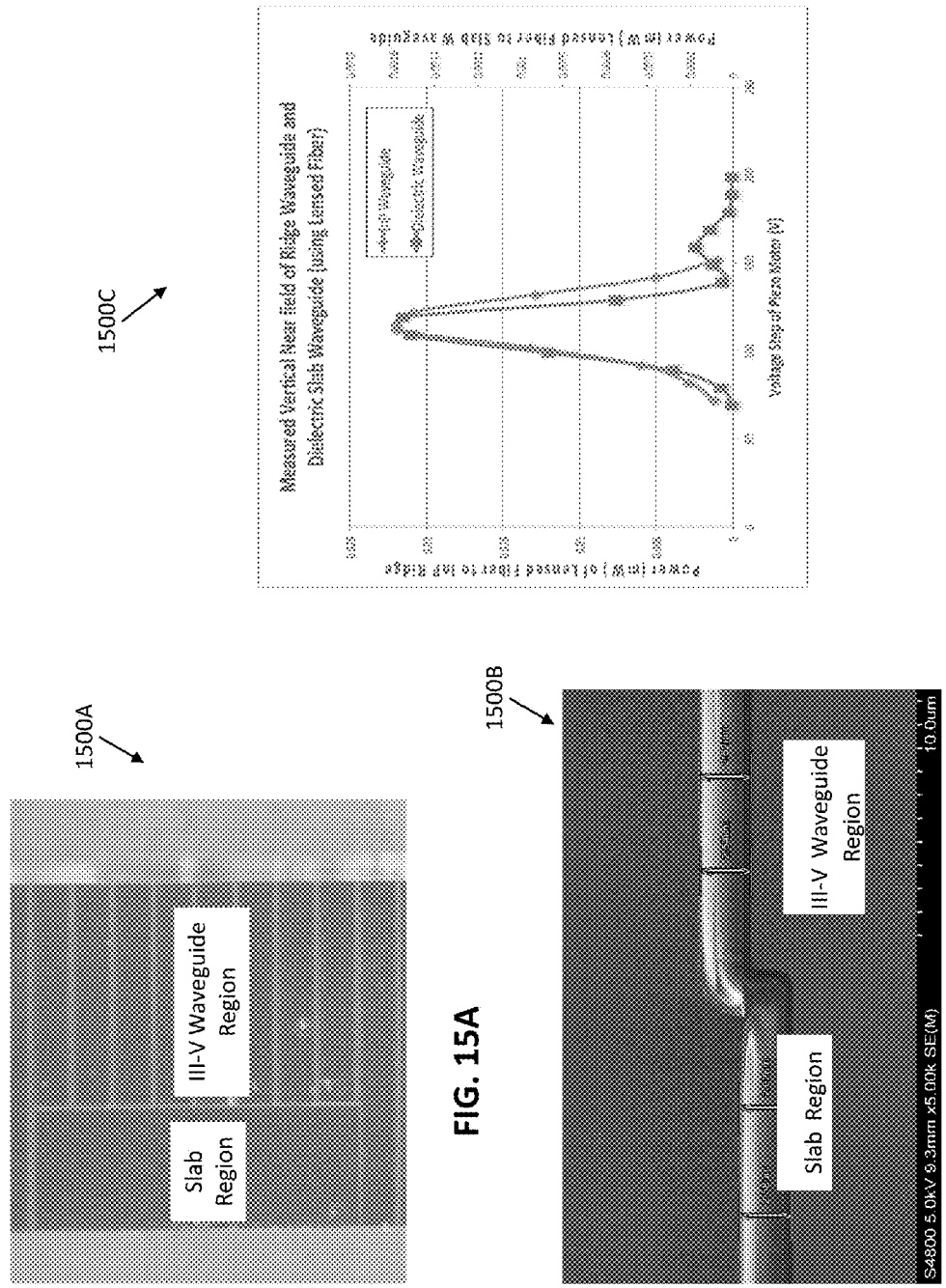
FIGS. 15A and 15B are top and cross sectional views, respectively, of an embedded dielectric waveguide in the PIC of FIG. 3A, in accordance with an embodiment of the present invention.
FIG. 15C is a graph showing measured optical signals in the dielectric waveguide of FIGS. 15A and 15B that is coupled to a III-V waveguide in accordance with an embodiment of the present invention.

Referring now to FIG. 14, a cross-section of a waveguide structure 1400 of the PIC 300 with dielectric filters 1402 on the sidewall of etched III-V structure 1404 upon a substrate 302 formed using a III-V semiconductor material in accordance with another embodiment of the present invention is shown. In an embodiment, the III-V structure 1404 is an InP structure 1404. In an embodiment, each of the first through fourth filters 504a-504d include the filter layers 1402.

A dielectric waveguide 1408 is grown within the opening and the sidewalls of the InP structure 1404. The dielectric waveguide 1408 is deposited and patterned atop an initial metal layer 1410. The metal layer 1410 may be etched off from the bottom prior to the deposition of the dielectric waveguide 1408. Table 6 includes the multiple dielectric layers 1412-1422 of the dielectric waveguide 1408.

TABLE 6

Dielectric Waveguide 1408 for Dielectric Filters 1402 on Sidewalls of InP Feature 1404

| Layer | Material | Refractive Index |
|---|---|---|
| 1412 | $SiO_2$ | 1.445 |
| 1414 | $SiO_{X1}N_{Y1}$ | 1.65 |
| 1416 | $SiO_{X2}N_{Y2}$ | 1.75 |
| 1418 | $SiO_{X3}N_{Y3}$ | 1.85 |
| 1420 | $SiO_{X4}N_{Y4}$ | 1.95 |
| 1422 | $SiO_{X5}N_{Y5}$ | 1.75 |

Referring now to FIGS. 15A, 15B, and 15C, top view and cross sectional view of an embedded dielectric waveguide in a III-V epitaxial grown structure, and a waveguide mode in the InP waveguide and exiting the dielectric waveguide 308 in accordance with an embodiment of the present invention are shown. FIG. 15A shows a top view of the PIC 300 and the FIG. 15B shows a side view of the PIC 300. FIG. 15C shows the optical mode travelling through the dielectric waveguide 308 and the III-V waveguides 306. Thus, the optical mode in the dielectric waveguide 308 is matched to the optical mode travelling through the III-V waveguides 306.

Accordingly, it would be evident to one of skill in the art that embodiments of the invention relate to introducing at least one of dielectric slab and ridge waveguides on III-V photonic integrated circuit 300. In order to introduce the waveguides, low stress dielectric materials, i.e., $Si_3N_4$, $SiO_xN_Y$, AlN, and $SiO_2$ are utilized. These materials that have lower refractive index temperature variation, when coupled with a polymer layer with negative refractive index variation, can reduce variation of refractive index with temperature as evident from Table 1.

Accordingly, the integration of the dielectric waveguide 308 on an epitaxial grown III-V substrate 302 enables devices that are grown on the III-V substrate 302 to be matched to wavelength selectable elements. The change in refractive index with temperature of III-V and Group IV materials is an order of magnitude greater than most dielectrics. The dielectric waveguide 308 is one of a ridge structure that is matched to a ridge structure of a waveguide grown on the PIC 300, a slab waveguide that is matched to the ridge structure of the waveguide of the PIC 300, a slab waveguide formed using a re-entrant etched space in the PIC 300, a slab waveguide formed such that it can be used in selective area regrowth of at least one of an active waveguide 310 and a passive waveguide 312, and a buried waveguide structure.

By using dielectrics on the photonic integrated circuits (PICs) 300 and utilizing dielectric waveguide 308 in combination with a polymer over-coating reduces the sensitivity to temperature. The combination of these materials enables lower temperature sensitivity of the grating devices and path length wavelength devices such as in multiplexers and de-multiplexers, "Zig-Zag" elements (see FIG. 5) and waveguides.

To enable the integration there are four options to enable the dielectric waveguide 308 integration:
- Option A: Etching into the III-V substrate 302 and depositing using PECVD processes;
- Option B: Partially growing the PIC 300, then depositing the dielectric material and growing other elements using selective re-growth;
- Option C: Wafer bonding the dielectric elements to the III-V photonic integrated circuit 300; and
- Option D: Growth of rare earth oxide(s) on silicon and the deposition of dielectric, selective patterning, and growth of III-V material on the rare earth oxide(s) interface.

To enable efficient coupling between III-V PIC waveguides (i.e., III-V waveguides 306) and dielectric waveguides 308 grown on the substrate 302, an AR coating is employed in options (A) and (B) by suitable use of at least one of λ/4 material and multi-layer stack at the interface to the dielectric waveguide layers. With respect to Option D then this enables III-V growth on silicon as the rare earth element oxide(s) enable strain relaxation layers. The rare earth element oxide (s) acts a buffer layer. The III-V growth is the growth of III-V waveguides 306, and active and passive elements 310 and 312 using at least one of MOCVD, MBE, and CVD deposition processes. For example, GaN on silicon may be enabled through rare earth oxides growth via Molecular Beam Epitaxy.

To further enable efficient coupling, the dielectric waveguides 308 are mode matched to the III-V waveguides 306 on the III-V substrate 302. The mode matching requires that at least one of ridge and buried waveguides are formed in the III-V Epitaxial stack initially and these are then matched to at least one of a dielectric slab guide (vertical confinement only), a dielectric ridge waveguide, and a buried dielectric waveguide (vertical and horizontal confinement). Mode matching is achieved by utilizing dielectric material stacks with a pre-determined stress and refractive index. These are subsequently processed to define and etch ridge waveguide interfaces between the dielectric material and the InP waveguide.

To enable small etch depth and to enable the E-field boundary conditions to improve the E-field strength, the metal layer 706 is deposited between the III-V waveguides 306 and the dielectric waveguide 308. By controlling the thickness and the refractive index in each layer of the dielectric waveguide 308, good coupling is achieved between the III-V waveguides 306 and the dielectric waveguide 308.

Since implementation of the embedded dielectric waveguide 308 in the III-V Photonic integrated circuit 300 reduces dn/dT of a grating 406 and a phase interference device 416, the PIC 300 consumes less power and size. Further it eliminates use of heaters and coolers in the PIC 300.

Figure 16:
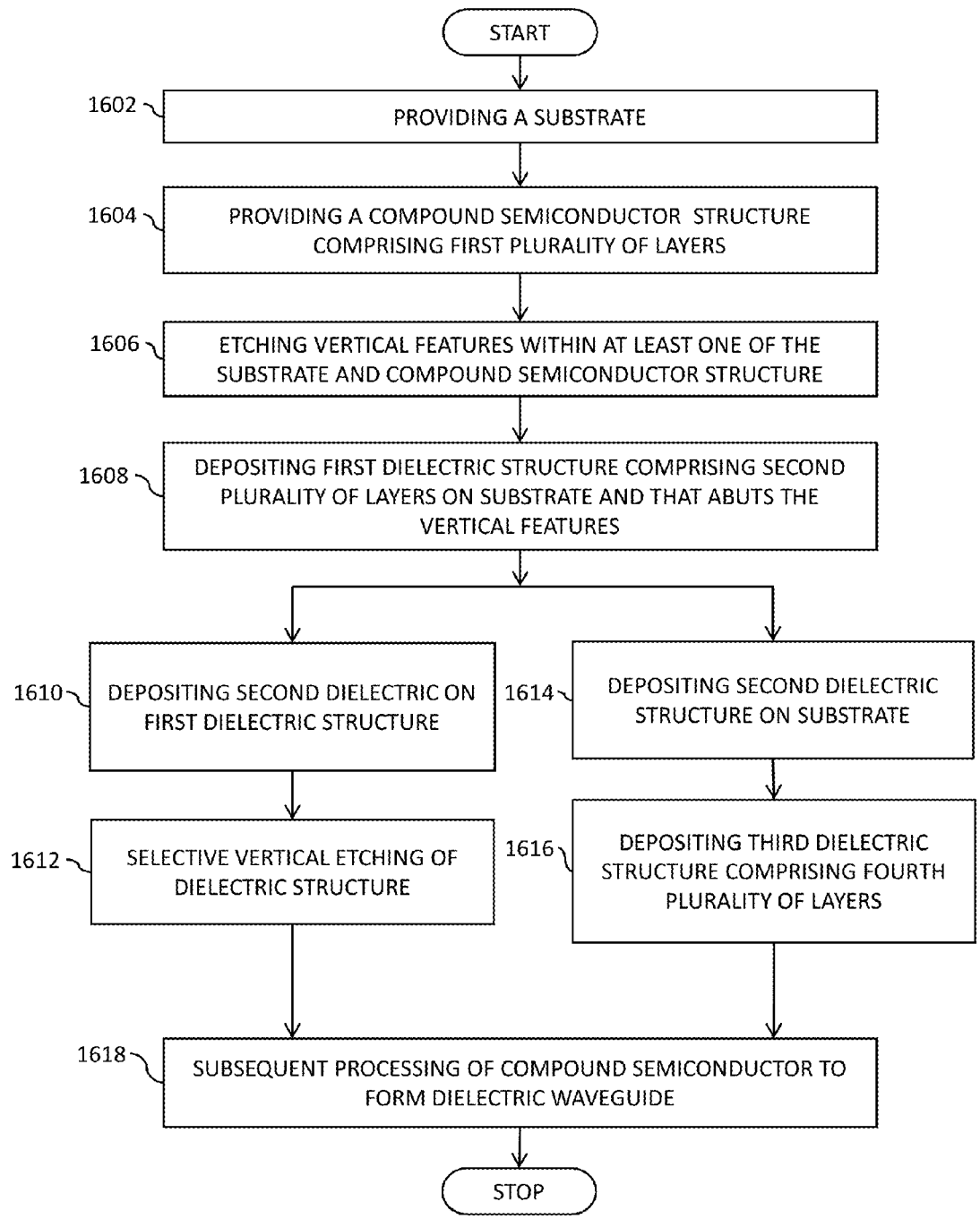
FIG. 16 is a flow chart for fabricating the PIC of FIG. 3A in accordance with an embodiment of the present invention.

Referring now to FIG. 16, a flow chart illustrating a method for fabricating the PIC 300 in accordance with an embodiment of the present invention is shown. The method steps 1602-1612 and step 1618 forms the PIC 400A. The method steps 1602-1608 and 1614-1618 forms the PIC 400B. At step 1602, a substrate 302 is provided. At step 1604, a III-V compound semiconductor structure comprising a first plurality of layers is grown on the substrate 302. At step 1606, a plurality of vertical features are etched within at least one of the substrate 302 and the III-V compound semiconductor structure. In an example, the III-V compound semiconductor structure is at least one of the III-V waveguides 306, the echelle grating 406, the first and second passive waveguides 520 and 522, and the optical receiver 314. At step 1608, a first dielectric structure 708 comprising a second plurality of layers 708a-708d is deposited upon the substrate 302 such that the first dielectric structure 708 abuts the plurality of vertical features. In one embodiment, the plurality of vertical features are part of an echelle grating 406 and the first dielectric structure 708 is a predetermined portion of a slab waveguide 404 of the echelle grating 406. At step 1610, a second dielectric structure comprising a third plurality of layers is deposited on a predetermined portion of the first dielectric structure 708. In one embodiment, the second dielectric structure 710 is a polymer layer 710 that reduces the temperature dependent refractive index variation of an optical waveguide comprising the first and second dielectric structures 708 and 710. At step 1612, selective vertical etching of the second dielectric structure 710 is performed.

At step 1614, a second dielectric structure 416 comprising a third plurality of layers is deposited on the substrate 302. In another embodiment, the first dielectric structure is at least one of input and output slab waveguides 414 and 418 forming a first predetermined portion of the PIC 400B and the second dielectric structure 416 is a phased waveguide array 416 forming the second predetermined portion of the PIC 400B. The phased waveguide array 416 corresponds to the arrayed waveguide grating 416. At step 1616, a third dielectric structure 710 comprising a fourth plurality of layers is deposited on at least one of a predetermined portion of the first dielectric structure and a predetermined portion of the second dielectric structure 416. The third dielectric structure 416 reduces the temperature dependent refractive index variation of the at least one of the first dielectric structure and the second dielectric structure 418. At step 1618, the first dielectric structure is selectively etched to form the dielectric waveguide 708. In one embodiment, the third dielectric structure is a polymer layer that reduces the temperature dependent refractive index variation of an optical waveguide comprising the first and second dielectric structures.

Figure 17:
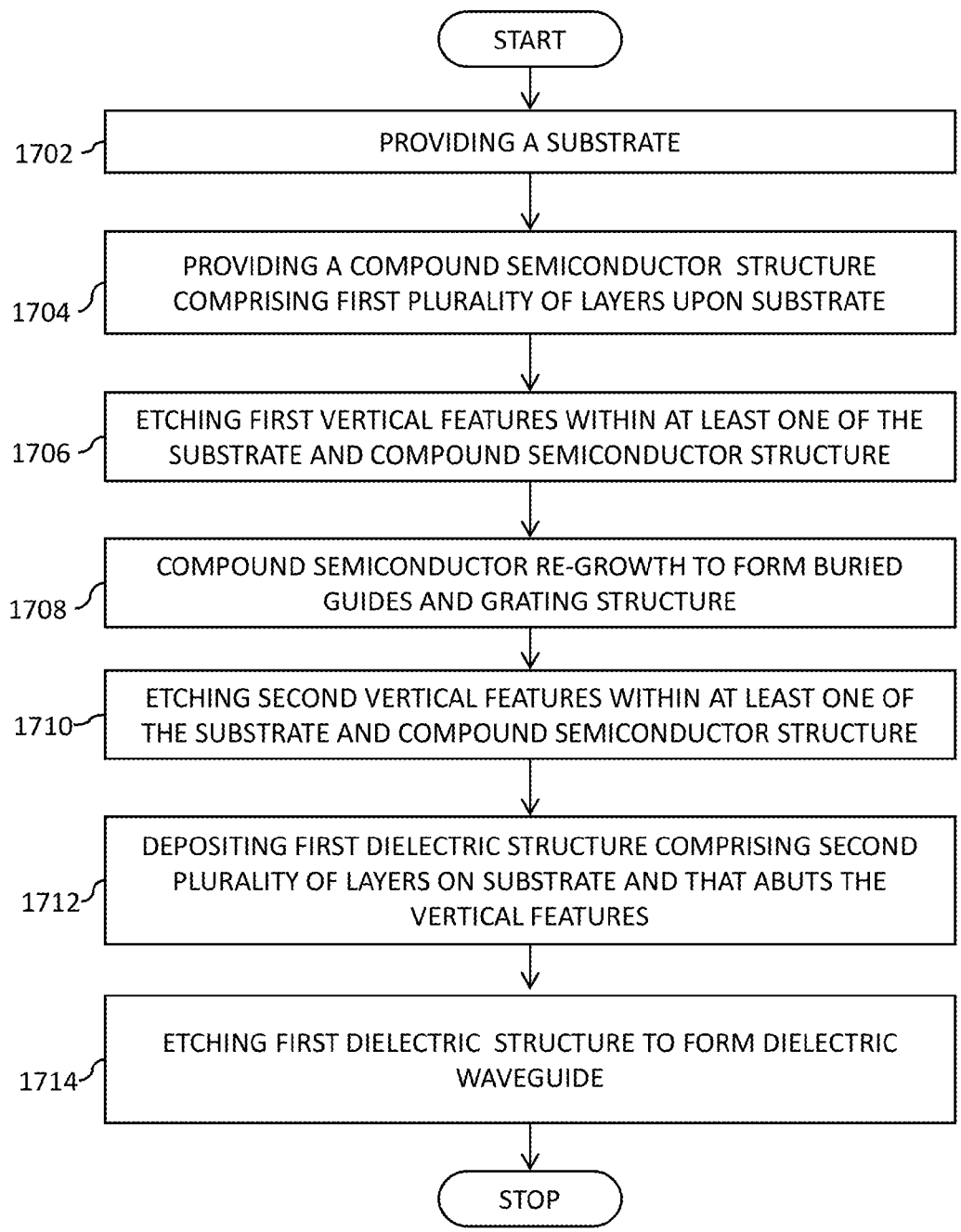
FIG. 17 is a flow chart for fabricating the PIC of FIG. 3A in accordance with another embodiment of the present invention.

Referring now to FIG. 17, a flow chart illustrating a method for fabricating a PIC 300 in accordance with an another embodiment of the present invention is shown. At step 1702, a substrate 302 is provided. At step 1704, a first III-V compound semiconductor structure comprising a first plurality of layers is grown on the substrate 302. At step 1706, a first plurality of vertical features are etched within at least one of the substrate 302 and the first III-V compound semiconductor structure. In an embodiment, the first III-V compound semiconductor structure is at least one of waveguide of the PIC 300, a passive waveguide 306, and the optical detector 310. At step 1708, a second III-V compound semiconductor structure is provided to form at least one of a buried waveguide and at least one of the echelle grating 406 and the AWG 416. At step 1710, a second plurality of vertical features are etched within at least one of the substrate 302 and the second III-V compound semiconductor structure. At step 1712, a first dielectric structure comprising a second plurality of layers is deposited on the substrate 302 and that abuts the second plurality of vertical features. At step 1714, the first dielectric structure is selectively etched to form the dielectric waveguide 708.

Within the preceding embodiments of the invention these have been described with respect to wavelength division multiplexers and primarily receiver side devices demultiplexing and coupling to photodetectors. However, it would be evident to one skilled in the art that the methods and designs may be modified and adapted to provide a range of optical components and optical functions where the dielectric waveguide reduces the wavelength sensitivity of the implemented optical component and optical function relative to that where the optical component and/or optical function are implemented solely within a compound semiconductor structure.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A photonic integrated circuit (PIC) grown by epitaxy on a substrate, the PIC comprising:
at least one active element formed over a first portion of the substrate, wherein the substrate and the at least one active element are formed using a III-V compound semiconductor material;
a III-V compound semiconductor waveguide formed over a second portion of the substrate, wherein the III-V compound semiconductor waveguide is formed from a III-V compound semiconductor structure, and wherein the III-V compound semiconductor structure is formed by etching the substrate; and
a dielectric waveguide, formed over a third etched portion of the substrate, such that the dielectric waveguide is in optical contact with the at least one active element by way of the III-V compound semiconductor waveguide, and abuts the III-V compound semiconductor waveguide.

2. The PIC of claim 1, further comprising an anti-reflection layer deposited within the dielectric waveguide.

3. The PIC of claim 1, further comprising a plurality of output waveguides, wherein Ex and Ey field profiles of a mode in the dielectric waveguide match Ex and Ey field profiles of a mode in the III-V compound semiconductor waveguide and the plurality of output waveguides.

4. The PIC of claim 3, further comprising:
a spot-size converter formed over the substrate and optically coupled to the dielectric waveguide, wherein the spot-size converter receives a first optical mode from the dielectric waveguide and provides a second optical mode to the III-V compound semiconductor waveguide, the plurality of output waveguides, a photo-diode, an optical amplifier, and an optical emitter.

5. The PIC of claim 1, further comprising a grating element that is optically connected to the III-V compound semiconductor waveguide and couples the III-V compound semiconductor waveguide to at least one of external single mode and multimode optical fibers.

6. The PIC of claim 1, further comprising a metal layer deposited on the substrate, wherein the dielectric waveguide is formed on the metal layer.

7. The PIC of claim 1, wherein the dielectric waveguide is one of:
i) a slab waveguide that is matched to a ridge structure of a waveguide of the PIC;
ii) a ridge waveguide that is matched to the ridge structure of the waveguide of the PIC;
iii) a slab waveguide formed using a re-entrant etched space in the PIC;
iv) a slab waveguide formed such that it can be used in selective area regrowth of at least one of an active waveguide and a passive waveguide; and
v) a buried waveguide structure.

8. The PIC of claim 1, wherein the PIC comprises an alloy of at least one of InGaAsP, AlGaAs, and InGaAlAs.

9. The PIC of claim 1, wherein the at least one active element comprises at least one of an optical emitter, a photodetector, a photodiode, and an optical receiver.

10. A method for manufacturing a photonic integrated circuit, the method comprising:
providing a substrate, wherein the substrate is formed using a III-V compound semiconductor material;
providing an active element over a first portion of the substrate, wherein the active element is formed from a III-V compound semiconductor material;
providing a III-V compound semiconductor structure by etching a second portion of the substrate, wherein the III-V compound semiconductor structure includes a first plurality of layers;
etching a plurality of vertical features within at least one of a third portion of the substrate and a predetermined portion of the III-V compound semiconductor structure; and
depositing a first dielectric structure comprising a second plurality of layers upon the substrate such that the first dielectric structure abuts the plurality of vertical features.

11. The method of claim 10, further comprising:
depositing a second dielectric structure comprising a third plurality of layers upon a predetermined portion of the first dielectric structure, wherein the plurality of vertical features are part of an echelle grating and the first dielectric structure is a predetermined portion of a slab waveguide of the echelle grating, and wherein the second dielectric structure is a polymer layer.

12. The method of claim 10, further comprising:
depositing a second dielectric structure comprising a third plurality of layers upon the substrate such that the second dielectric structure at least one of abuts and fills a second predetermined portion of the plurality of vertical features, wherein the first dielectric structure is at least one of an input slab waveguide and an output slab waveguide forming a first predetermined portion of an arrayed waveguide grating, and wherein the second dielectric structure is a phased waveguide array forming a second predetermined portion of the arrayed waveguide grating.

13. The method of claim 12, further comprising:
depositing a third dielectric structure comprising a fourth plurality of layers upon at least one of a predetermined portion of the first dielectric structure and a predetermined portion of the second dielectric structure, wherein the third dielectric structure is a polymer layer.

14. The PIC of claim 1, wherein the dielectric waveguide is formed from a plurality of layers that include:
a Silicon dioxide layer formed on at least one of the substrate and a metal layer;
a first Silicon oxynitride layer formed on the Silicon dioxide layer;
a second Silicon oxynitride layer formed on the first Silicon oxynitride layer; and
a third Silicon oxynitride layer formed on the second Silicon oxynitride layer.

15. The PIC of claim 1, wherein the III-V compound semiconductor structure comprises:
a first Indium gallium arsenide phosphide (InGaAsP) layer formed over the substrate, wherein the first InGaAsP layer is an etch stop layer for deposition of the dielectric waveguide;
a second InGaAsP layer formed above the first InGaAsP layer; and
a thin waveguide layer formed above the second InGaAsP layer, wherein the thin waveguide layer is formed using a III-V compound semiconductor material, and wherein the III-V compound semiconductor material is at least one of InGaAsP and InGaAlAs.

16. The PIC of claim 1, wherein the dielectric waveguide is formed from a plurality of layers that include:
a first Silicon dioxide layer formed on at least one of a metal layer and the substrate, wherein the metal layer is formed on an Indium gallium arsenide phosphide (InGaAsP) layer, and wherein the InGaAsP layer is formed on the substrate;
a Silicon nitride layer formed on the first Silicon dioxide layer;
a second Silicon dioxide layer formed on the Silicon nitride layer;
a first Silicon oxynitride layer formed on the second Silicon dioxide layer; and
a second Silicon oxynitride layer formed on the first Silicon oxynitride layer.

17. The PIC of claim 1, wherein the dielectric waveguide is formed from a plurality of layers that include:
a Silicon dioxide layer formed on at least one of the substrate and a metal layer, wherein the metal layer is formed on the substrate;
a Silicon nitride layer formed on the Silicon dioxide layer;
a first Silicon oxynitride layer formed on the Silicon nitride layer;
a second Silicon oxynitride layer formed on the first Silicon oxynitride layer;
a third Silicon oxynitride layer formed on the second Silicon oxynitride layer; and
a fourth Silicon oxynitride layer formed on the third Silicon oxynitride layer.

18. The PIC of claim 1, further comprising:
first through fourth dielectric filters formed on a sidewall of the III-V compound semiconductor structure, wherein each dielectric filter of the first through fourth dielectric filters receives an input beam, separates a first wavelength of the input beam, and transmits the input beam having the first wavelength.

19. The PIC of claim 1, further comprising a grating element, wherein the grating element is an echelle grating that is in optical contact with the dielectric waveguide, wherein the echelle grating is formed from the III-V compound semiconductor structure, and wherein the echelle grating performs one of:
receiving an input optical signal, and generating a plurality of output optical signals; and
receiving the plurality of output optical signals, and generating the input optical signal.

20. The PIC of claim 1, further comprising a grating element, wherein the grating element is an arrayed waveguide grating that is in optical contact with the dielectric waveguide at a first side and a second dielectric waveguide at a second side, wherein the arrayed waveguide grating is formed from at least one of dielectric materials and the III-V compound semiconductor structure, and wherein the arrayed waveguide grating performs one of:
receiving an input optical signal, and generating a plurality of output optical signals; and
receiving the plurality of output optical signals, and generating the input optical signal.

21. The PIC of claim 1, further comprising a polymer layer deposited on the dielectric waveguide, wherein the polymer coating layer has a negative thermal coefficient of refractive index.

* * * * *